(12) United States Patent
Okita

(10) Patent No.: US 10,979,626 B2
(45) Date of Patent: Apr. 13, 2021

(54) IMAGE CAPTURING APPARATUS, METHOD OF CONTROLLING SAME, AND STORAGE MEDIUM FOR REDUCING POWER CONSUMPTION IN TRANSMISSION OF IMAGE DATA

(71) Applicant: CANON KABUSHIKI KAISHA, Tokyo (JP)

(72) Inventor: Masaki Okita, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/576,897

(22) Filed: Sep. 20, 2019

(65) Prior Publication Data

US 2020/0106957 A1 Apr. 2, 2020

(30) Foreign Application Priority Data

Sep. 28, 2018 (JP) .............................. JP2018-184985

(51) Int. Cl.
*H04N 5/232* (2006.01)
*H04N 5/04* (2006.01)
*H04N 5/77* (2006.01)

(52) U.S. Cl.
CPC ........... *H04N 5/23227* (2018.08); *H04N 5/04* (2013.01); *H04N 5/23229* (2013.01); *H04N 5/23245* (2013.01); *H04N 5/23293* (2013.01); *H04N 5/772* (2013.01)

(58) Field of Classification Search
CPC .. H04N 5/23227; H04N 5/23245; H04N 5/04; H04N 5/23229; H04N 5/772; H04N 5/23293
See application file for complete search history.

(56) References Cited

U.S. PATENT DOCUMENTS

| | | | |
|---|---|---|---|
| 9,204,030 B2 | 12/2015 | Okita | |
| 10,306,192 B2 | 5/2019 | Okita | |
| 2005/0179782 A1* | 8/2005 | Endo | .................. H04N 5/23203 348/207.99 |
| 2016/0006559 A1* | 1/2016 | Arai | ...................... H04L 7/0331 375/376 |
| 2017/0295343 A1* | 10/2017 | Konishi | ............... G09G 3/3666 |

FOREIGN PATENT DOCUMENTS

JP 2009201540 A 9/2009

* cited by examiner

*Primary Examiner* — Padma Haliyur
(74) *Attorney, Agent, or Firm* — Carter, DeLuca & Farrell LLP

(57) ABSTRACT

An image capturing apparatus is provided with an image sensor having a pixel portion in which a plurality of pixels are arranged and a transmission unit for transmitting an overlap signal in which image data obtained from the pixel portion and a clock are overlapped, an image processing unit that has a reception unit for receiving the overlap signal from the transmission unit of the image sensor and is for reproducing the image data and the clock, and a control unit for controlling the image sensor and the image processing unit, wherein, before the transmission unit starts transmission of the image data, the control unit performs control so as to cause a training signal, for synchronizing the transmission unit and the reception unit in frequency, to be transmitted from the transmission unit.

19 Claims, 17 Drawing Sheets

IMAGE CAPTURING APPARATUS, METHOD OF CONTROLLING SAME, AND STORAGE MEDIUM FOR REDUCING POWER CONSUMPTION IN TRANSMISSION OF IMAGE DATA

BACKGROUND OF THE INVENTION

Field of the Invention

The present invention relates to a technique for transmitting and receiving data between devices in an image capturing apparatus.

Description of the Related Art

In recent years, there has been an increasing need for high-speed data transmission systems between image sensors and image processing apparatuses because of the need to cope with high-speed continuous shooting of digital cameras and high-throughput moving image standards such as 4 K and 8 K.

Conventionally, in data transmission between devices, a clock and data are connected by different wiring based on LVDS (Low Voltage Differential Signaling), and techniques such as increasing frequencies or using a plurality of lanes have been used in order to obtain a required data transfer rate.

Further, in the case of using a frequency for high-speed data transfer in a method of communicating a clock and data by separate wiring, it has become difficult to secure a skew margin between the clock and data, and a method of overlapping the clock and data and communicating them by the same wiring has been adopted.

Further, in order to increase the number of still images that can be shot and the amount of time in which moving images can be shot in the image capturing apparatus, it is necessary to frequently switch operation on and off because it is also necessary to reduce the power consumption of the transmission unit.

For example, Japanese Patent Laid-Open No. 2009-201540 discloses a data transmission technique that uses a clock data recovery circuit in an image capturing apparatus.

However, in the data transmission using the clock data recovery circuit as in Japanese Patent Laid-Open No. 2009-201540, in a case of reproducing the clock and the data from the received data, the power consumption for maintaining the synchronization state of a transmission circuit and a reception circuit becomes large.

In particular, in an image capturing apparatus driven by a battery such as a digital camera, it is necessary to suppress power consumption by on/off control of the data transmission unit in order to increase the shooting time and the number of images that can be shot.

SUMMARY OF THE INVENTION

The present invention has been made in view of the above-mentioned problems, and provides an image capturing apparatus capable of reducing power consumption in transmission of image data between an image sensor and a signal processing circuit.

According to one aspect of the present invention, there is provided an image capturing apparatus, comprising: an image sensor having a pixel portion in which a plurality of pixels are arranged, and a transmission circuit configured to transmit an overlap signal in which image data obtained from the pixel portion and a clock are overlapped; and at least one processor or circuit configured to function as the following units: an image processing unit that has a reception circuit configured to receive the overlap signal from the transmission circuit of the image sensor, and is configured to reproduce the image data and the clock; and a control unit configured to control the image sensor and the image processing unit, wherein, before the transmission circuit starts transmission of the image data, the control unit performs control so as to cause a training signal, for synchronizing the transmission circuit and the reception circuit in frequency, to be transmitted from the transmission circuit.

According to another aspect of the present invention, there is provided a method of controlling an image capturing apparatus provided with an image sensor having a pixel portion in which a plurality of pixels are arranged and a transmission circuit operable to transmit an overlap signal in which image data obtained from the pixel portion and a clock are overlapped, and an image processing unit that has a reception circuit operable to receive the overlap signal from the transmission circuit of the image sensor, and is operable to reproduce the image data and the clock, the method comprising: controlling the image sensor and the image processing unit, wherein, in the controlling, before the transmission circuit starts transmission of the image data, control is performed so as to cause a training signal for synchronizing the transmission circuit and the reception circuit in frequency to be transmitted from the transmission circuit.

According to still another aspect of the present invention, there is provided a non-transitory computer-readable storage medium storing a program for causing a computer to execute a method of controlling an image capturing apparatus provided with an image sensor having a pixel portion in which a plurality of pixels are arranged and a transmission circuit operable to transmit an overlap signal in which image data obtained from the pixel portion and a clock are overlapped, and an image processing unit that has a reception circuit operable to receive the overlap signal from the transmission circuit of the image sensor, and is operable to reproduce the image data and the clock, the method comprising: controlling the image sensor and the image processing unit, wherein, in the controlling, before the transmission circuit starts transmission of the image data, control is performed so as to cause a training signal, for synchronizing the transmission circuit and the reception circuit in frequency, to be transmitted from the transmission circuit.

Further features of the present invention will become apparent from the following description of exemplary embodiments with reference to the attached drawings.

DESCRIPTION OF THE EMBODIMENTS

Hereinafter, referring to the attached drawings, embodiments of the present invention will be described in detail.

First Embodiment

Figure 1:
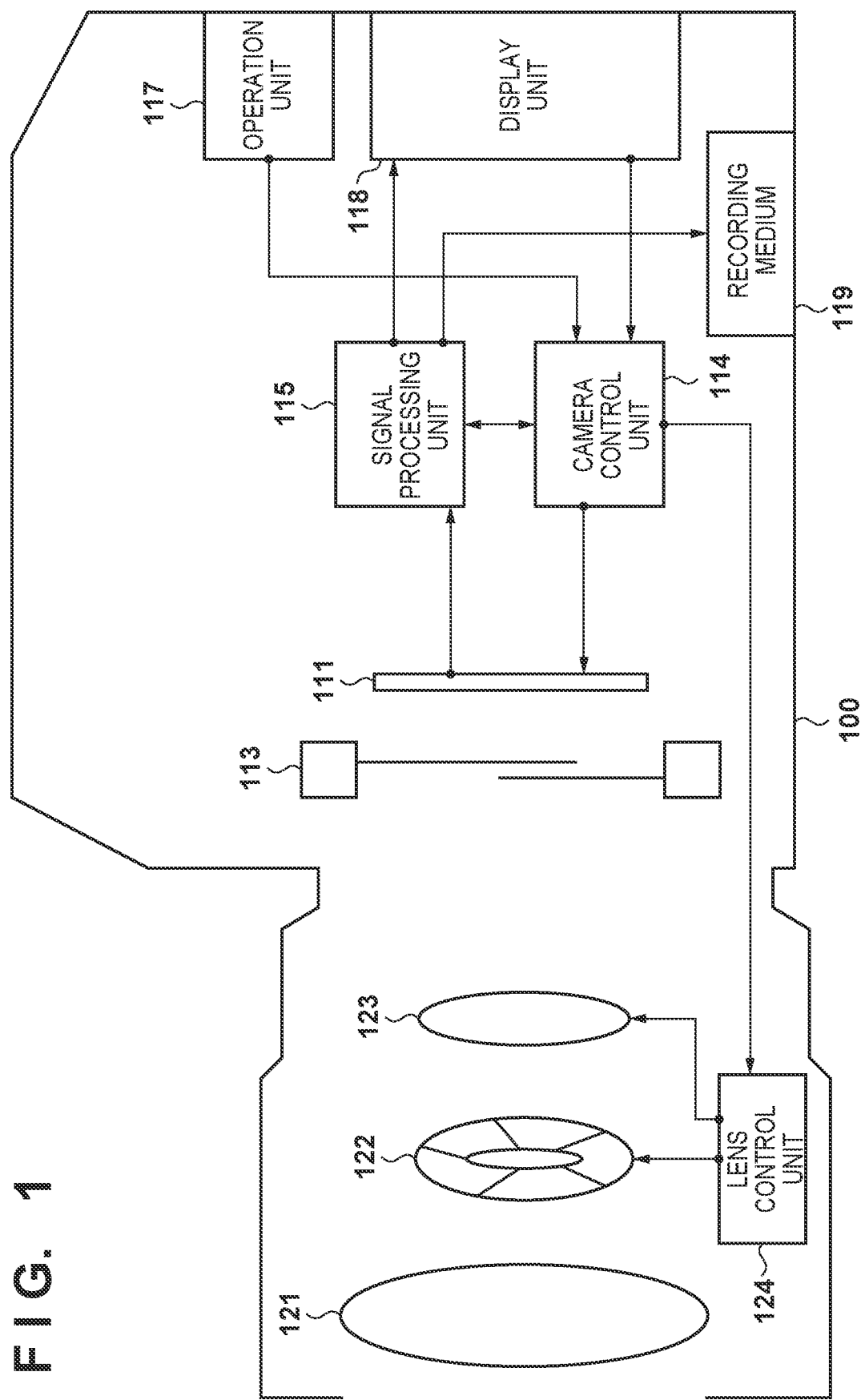
FIG. 1 is a block diagram illustrating a configuration of an image capturing apparatus according to a first embodiment of the present invention.

FIG. 1 is a block diagram illustrating a configuration of an image capturing apparatus according to a first embodiment of the present invention. In FIG. 1, an image capturing apparatus 100 includes an image sensor 111, a mechanical shutter 113, a camera control unit 114, a signal processing unit 115, an operation unit 117, a condenser lens 121, an aperture 122, a focus lens 123, and a lens control unit 124.

A user can designate details of control of the camera control unit 114 and the lens control unit 124 by operating an AF start button and a shooting start button (not shown) of the operation unit 117, and perform an AF operation, a shooting operation, and the like. In addition, a menu button and a control button are also arranged in the operation unit 117, and by causing the display unit to display a menu screen, details of operation of the camera such as still image shooting or moving image shooting can be set.

Figure 2:
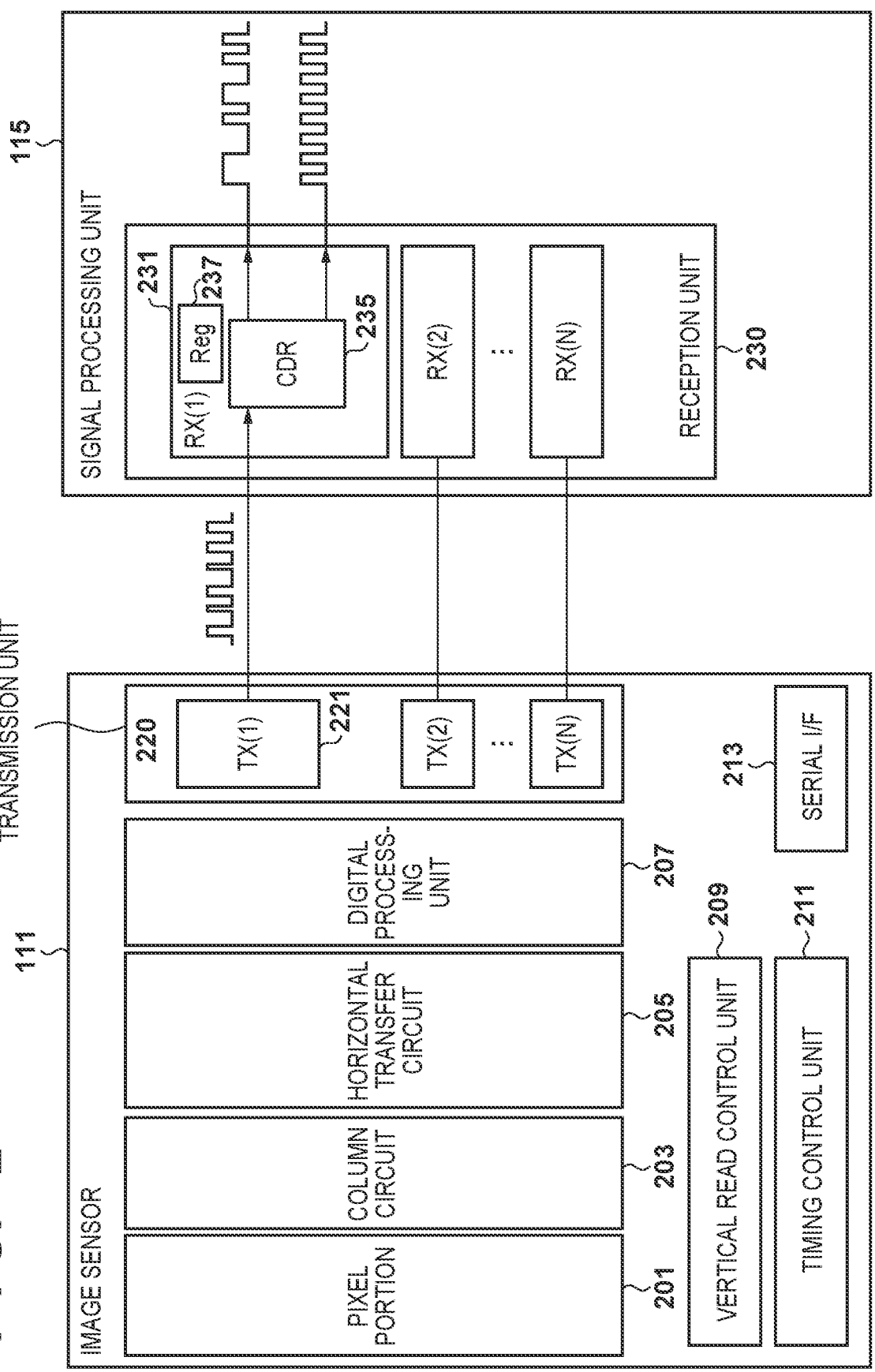
FIG. 2 is a block diagram illustrating a configuration of an image sensor and a signal processing unit.

As illustrated in FIG. 2, data transmission and reception are performed between the image sensor 111 and the signal processing unit 115 by using an embedded clock method in which data transmission is performed by a signal in which a clock and data are overlapped. A transmission unit 220 converts the data into serial data using a reference clock produced by a PLL inside the image sensor 111, and transmits the serial data to the reception unit 230 of the signal processing unit 115 (transmission operation). In the embedded clock method, the reception unit 230 does not have a reference clock, and reproduces a clock from a signal transmitted from the transmission unit 220, converts the data into parallel data using the reproduced clock, and outputs the parallel data to a block at a subsequent stage of the signal processing unit 115.

In order for the reception unit 230 to reproduce the clock and data, the transmission unit 220 transmits training data (a training signal) that repeats High and Low according to a particular reference pattern, and the reception unit 230 synchronizes with the frequency of the transmission unit 220 according to the output of the training data.

The signal processing unit 115 generates image data by performing correction processing and development processing on the data of the image sensor 111 inputted to the reception unit 230. The signal processing unit 115 includes a CPU, an image processing block to be described later, a RAM as a storage region, and the like as constituent components.

Hereinafter, the flow of data between the image sensor 111 and the signal processing unit 115 in the first embodiment will be described with reference to the block diagram illustrated in FIG. 2.

The image sensor 111 includes a pixel portion 201, a timing control unit 211, a vertical read control unit 209, a horizontal transfer circuit 205, a digital processing unit 207, a serial I/F 213, and the transmission unit 220. The image sensor 111 receives, by a pixel portion 201 that comprises photodiodes, an image signal formed on the image sensor 111 by a shooting lens of the image capturing apparatus 100, and converts the received image signal into a signal for each pixel. Data obtained by sequential digital conversion of voltages for each pixel in the column circuit 203 is sent to the digital processing unit 207 by the horizontal transfer circuit 205, subjected to digital processing such as clamping in the digital processing unit 207, and output to the outside of the image sensor 111 by the transmission unit 220. The transmission unit 220 transmits an overlap signal in which image data and a clock signal are overlapped.

The signal processing unit 115 includes a reception unit 230 which comprises a plurality of receiver circuits 231. Each receiver circuit 231 includes a CDR circuit 235 and storage registers 237, and reproduces a clock and data from a signal input to each receiver circuit 231.

Figure 3:
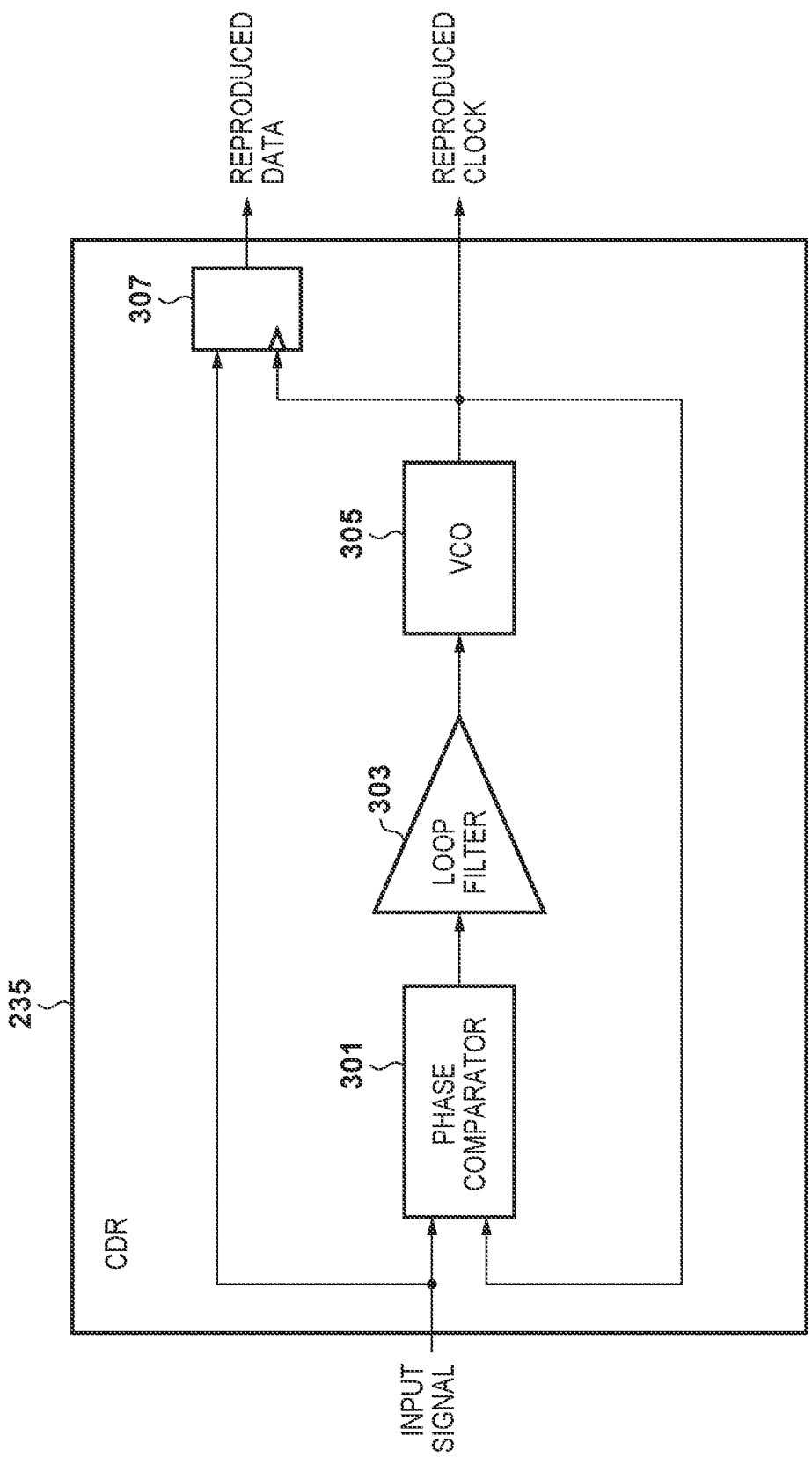
FIG. 3 is a block diagram illustrating a configuration of a CDR circuit.

FIG. 3 is a block diagram illustrating a configuration of the CDR circuit 235. In FIG. 3, the CDR circuit 235 includes a phase comparator 301, a loop filter 303, a VCO (voltage controlled oscillator) 305, and a data reproduction device 307.

The phase comparator 301 compares the phase of a clock outputted by the VCO with a data edge of an input signal, and outputs a voltage value corresponding to a phase difference. The loop filter 303 smooths the signal output by the phase comparator in alignment with an input voltage amplitude range and a response speed of the VCO 305, and amplifies the voltage of the output signal. The VCO 305 outputs a clock having a frequency in accordance with the voltage amplitude of the loop filter 303 that was inputted. The output clock of the VCO 305 is fed back to the phase comparator to synchronize with the input signal.

For the CDR circuit 235, what frequency and phase data is input in an initial state are unknown, and synchronization cannot be correctly performed, so it is necessary to receive a training signal from the transmission unit 220 when activated, and synchronize frequency and phase (training time period). The storage registers 237 have a function of storing a setting value corresponding to the output voltage of the VCO 305 of the CDR circuit 235. The output voltage at the time of activation of the VCO 305 is decided by referring to a value of the storage registers 237. By writing a setting value to the storage registers 237, the output voltage at the time of activation of the VCO 305 can be decided.

Figure 4:
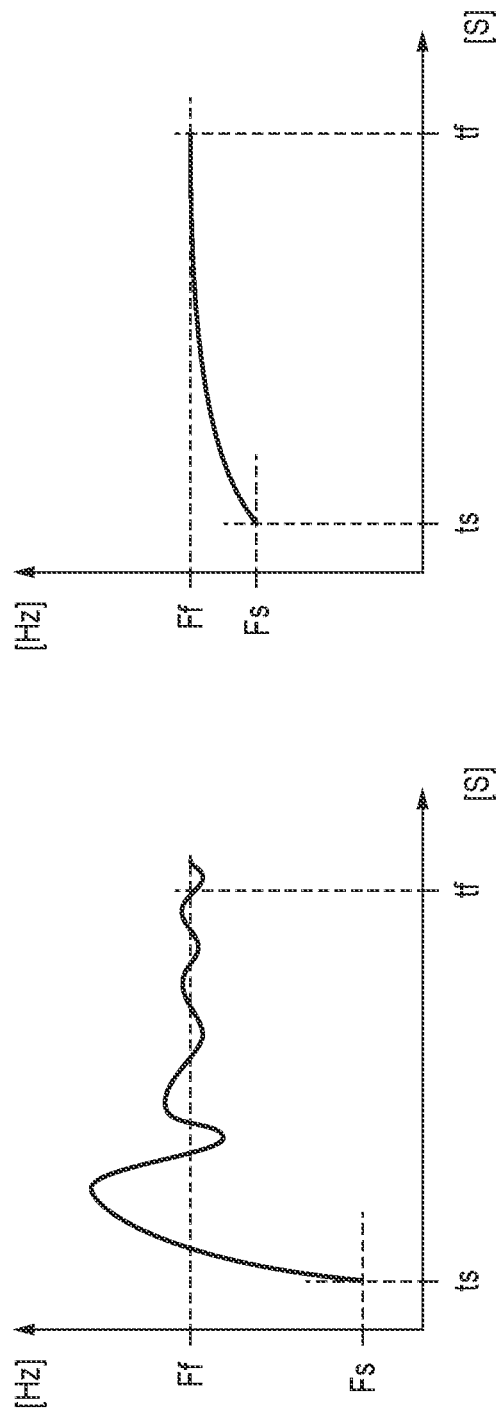
FIG. 4A and FIG. 4B are schematic diagrams illustrating situations of frequency synchronization.

For the phase comparator 301, it is possible to apply a gain for adjusting a voltage outputted thereby. FIGS. 4A and 4B are diagrams indicating, in a simplified manner, change over time from an initial frequency Fs to a frequency Ff after completion of synchronization when a gain amount of the phase comparator is set to A and B (A>B).

The larger the gain amount, the larger the feedback amount corresponding to the phase difference, and the shorter the amount of time that it takes to approach Ff, but when the gain amount is set to A, the overshoot also increases as illustrated by FIG. 4A. When the gain amount is set to B, it takes time as illustrated by FIG. 4B, but even after the synchronization is performed while suppressing overshoot, the state thereof is stable.

Ff is roughly decided by design based on the throughput of data of the image sensor 111 and the signal processing unit 115, but because Fs is decided by the state of the output frequency of the VCO, it is difficult to determine Fs at the time of activation of the image capturing apparatus, and Fs fluctuates every time the image capturing apparatus is activated. When the image capturing apparatus is activated, the gain amount is initially set to A and the gain amount is set to B during operation of the image capturing apparatus, thereby enabling frequency synchronization in a wide range of Fs. The frequency synchronization control having a large frequency adjustment amount performed at the time of activation is referred to as a first frequency synchronization control.

The training signal is a signal in which a HIGH level and a LOW level are outputted in a particular pattern. The clock outputted by the VCO 305 in a state where synchronization with the training signal is obtained is referred to as a reproduced clock, and the reproduced clock is supplied to the data reproduction device 307 to which the received signal is inputted, so that data can be extracted from the received signal.

As described above, after synchronization is obtained by the training signal, transmission of valid data from the transmission unit 220 starts, and the data is extracted. The data reproduced by the CDR circuit 235 from the serial data (overlap signal) in which the clock and the data are overlapped is referred to as reproduced data.

While the reception unit 230 is receiving valid data, the data edges of the input signal and the phase of the reproduced clock described above are detected, and the output frequency of the VCO 305 in the CDR circuit 235 is caused to change. As a result, even if the frequency or phase shifts due to a temperature change during data transmission or the like, it is possible to keep the synchronization state by following fluctuation of the frequency or phase.

Unlike the training signal described above, in serial data such as image data, because there are cases where HIGH or LOW signals are consecutive and pulse edges cannot be detected, synchronization may be lost if such a state continues for a long time.

Usually, in order to avoid such a problem, prior to transmitting the data obtained by overlapping the clocks and the data from the transmission unit 220, for example, a process such as "8b/10b conversion" is performed. 8b/10b conversion is data conversion in which 8-bit data is converted into 10-bit data and HIGH or LOW signals are set to 4 clocks or less. Rather than transfer efficiency of valid data decreasing, it is possible to detect a pulse edge by the reception unit, and robustness against frequency fluctuation is improved. It should be noted that the data obtained by the 8b/10b conversion needs to be decoded by the reception unit 231. Such processing is performed by blocks (not shown) in the transmission unit 220 of the image sensor 111 and the reception unit 230 of the signal processing unit 115.

A similar technique is "128b/130b conversion" in PCI EXPRESS 3.0/4.0, in which 128-bit valid data is caused to have a 2-bit preamble signal so that HIGH or LOW signals do not continue for a long period of time. Also, in the present embodiment, there is no limitation to "8b/10b conversion" and a conversion process having similar effects to those described above may be used.

As described above, once synchronization can be achieved between transmission and reception units, phase synchronization can be achieved as long as data transmission continues. However, in the image capturing apparatus, power consumption may be reduced by causing transmission and reception units to be idle when not during readout of the image sensor. With this arrangement, when an idle time period is provided for each frame of a moving image, synchronization is lost. However, since the prior state of the VCO is close to the previous frequency synchronization state, the gain amount is set to B, the frequency synchronization control is started, and the synchronization state is restored. Frequency synchronization control having a small frequency adjustment amount, which is performed with the gain amount at B at a time of restoration from an idle time period of the image sensor, is called second frequency synchronization control. In this second frequency synchronization control, since the previous state of the VCO is close to the previous frequency synchronization state, synchronization can be achieved in a shorter amount of time than in the first frequency synchronization control even though the gain amount is B. Therefore, the output time period of the training signal from the transmission unit 220 can be shortened accordingly.

Hereinafter, control for appropriately performing frequency synchronization control of transmission and reception units in various modes of the image capturing apparatus will be described.

Figure 5:
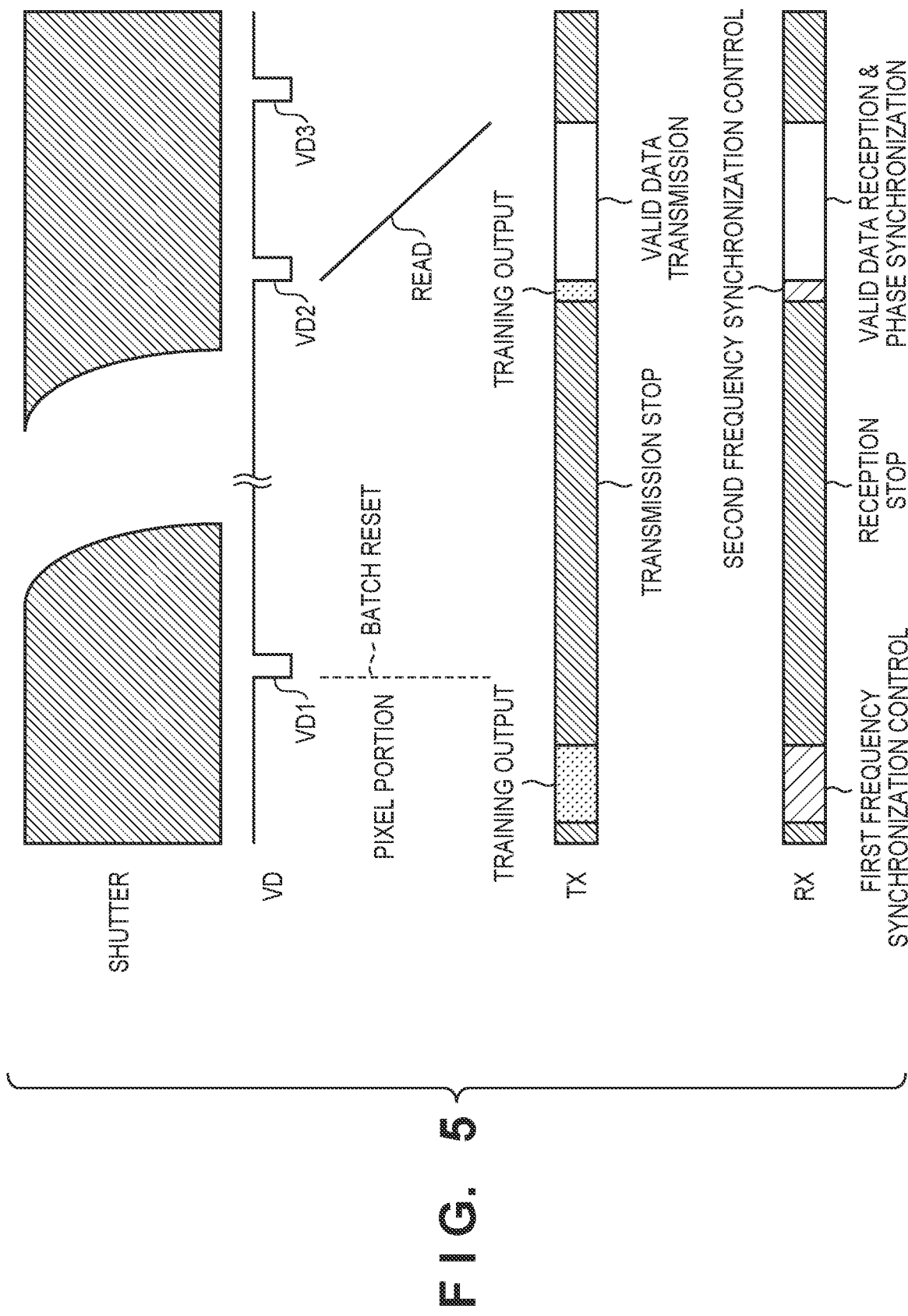
FIG. 5 is a schematic diagram illustrating an operation state of transmission and reception units at a time of still image shooting.

FIG. 5 is a schematic diagram illustrating driving of the image sensor and transmission and reception units in still image shooting by the image capturing apparatus. A user operates the shooting start button of the image capturing apparatus to start still image shooting. FIG. 5 illustrates the passage of time from a state where preparation for shooting (such as energization of the shutter, charging, and an activation sequence including the image sensor) is complete, which is after the operation of the shooting start button.

The camera control unit 114 supplies a control signal to the image sensor 111 to make an instruction, and performs a register setting via the serial OF 213. As a result, the state of the image sensor 111 is appropriately changed to control both accumulation necessary for shooting and readout, and to control the operation of the transmission unit 220. The image sensor 111 can accept a digital value from the outside through the serial I/F 213 and store the digital value in a register (not shown) to thereby reflect the content of the register in an operation.

In the image capturing apparatus 100, the timing of image capturing control is synchronized in accordance with a vertical synchronization signal VD between the image sensor 111 and the camera control unit 114. The vertical synchronization signal VD is a synchronization signal for synchronizing the start of the next operation and the start of the readout of the pixels of one frame, between the image sensor 111 and the camera control unit 114.

The registers 237 have an "immediate reflection register" which is reflected immediately after a digital value is written, and a "VD synchronization register" which is reflected in synchronization with a falling edge of the vertical synchronization signal VD which is the synchronization signal for a state transition of the image sensor 111. By making an assignment so that a value that needs to be changed at the time of a state transition is stored in the "VD synchronization register", the change content for the state transition can be collectively reflected to registers in synchronization with the synchronization signal VD regardless of a setting order or the like. In addition, in the present embodiment, the "immediate reflection register" is used for the control of the transmission and reception units in order to immediately reflect the state of the activation or stoppage of the image capturing apparatus.

Next, frequency synchronization control at the time of activation of the image capturing apparatus of the present embodiment will be described by taking a case of still image shooting as an example.

In order to perform still image shooting, the image sensor performs the operations of "accumulation", "readout", and "stop". The "accumulation" operation is an operation in which, charge is discharged collectively by the photodiodes of all the pixels of the pixel portion 201 of the image sensor 111, and after that, charge accumulation is performed. In the "readout" operation, charge that was accumulated in the photodiodes before transitioning to this operation is transferred row by row to the column circuit 203, an analog-to-digital conversion is performed, and then a result of the analog-to-digital conversion is sent from the horizontal transfer circuit 205 to the digital processing unit 207. The digital processing unit 207 performs clamp processing and gain processing. The "stop" operation is an operation for causing the clock supply in the image sensor 111 to stop when not in a communication time period. In still image shooting, the operations of "accumulation", "readout", and "stop" of the image sensor are sequentially executed to thereby obtain image data from charge accumulated in the "accumulation" operation.

The vertical synchronization signal VD illustrated in FIG. 5 is a control signal for causing the image sensor 111 to perform a state transition. In the present embodiment, the fall of a pulse of the vertical synchronization signal VD is detected, and a setting set in a VD synchronization register at that time is reflected to the circuit, and a state transition is performed. In a state in which preparation for shooting is complete, the transmission and reception units are both are in a stopped state (stopped), and the power consumption is low.

As illustrated in FIG. 5, when the image sensor 111 is activated, the first frequency synchronization control described above is performed to synchronize the frequencies of the transmission and reception units that vary every time the image sensor 111 is activated. After the completion of the first frequency synchronization control, the transmission unit 220 of the image sensor 111 and the reception unit 230 of the signal processing unit 115 are caused to temporarily idle.

In order to perform a sequence for shooting after activation, a register setting for transitioning to the "accumulation" state is set in the image sensor prior to the first vertical synchronization signal VD1. As a result, a batch reset operation is performed for all the pixels for a predetermined time period in synchronization with the vertical synchronization signal VD1, and accumulation is started upon release of the reset. Thereafter, the camera control unit 114 controls the opening and closing of the shutter 113 in accordance with the accumulation time period.

With the second vertical synchronization signal VD2 after the shutter is closed, the image sensor 111 is set to the "readout" state, and the signals of the pixels are sequentially outputted from the transmission unit 220. At this time, the voltage value at the time of the previous first frequency synchronization control is stored in the storage registers 237 of each lane, and each reception unit 230 restarts operation in a state close to that at the time of the previous frequency synchronization. The camera control unit 114 performs the second frequency synchronization control before (a predetermined amount of time before) the vertical synchronization signal VD2 for causing readout to start.

In this manner, when the reception unit 230 can resume operation in a state close to that of the time of the previous frequency synchronization, performing the second frequency synchronization control instead of the first frequency synchronization control can shorten the amount of time until synchronization is possible. Therefore, by performing the second frequency synchronization before readout, it is possible to shorten the amount of time required for frequency synchronization, and it is possible to lengthen the stop time period of the transmission and reception units by that amount and to reduce power consumption.

By the vertical synchronization signal VD2, the image sensor is set to the "readout" state, the digital data for each pixel is sequentially read out, and the data is transmitted from the transmission unit 220. Upon completely receiving data for a number of pixels, the operation of the reception unit 230 is caused to stop, and thereafter the operation of the transmission unit 220 is caused to stop. The third vertical synchronization signal VD3 serves as a trigger for setting the image sensor 111 to the "stop" state after the control related to the sequence of data transmission and reception described above is completed.

Next, frequency synchronization control at the time of restoring the transmission unit 220 from the idle state will be described by taking moving image shooting and live view driving as examples.

In order to perform live view driving for displaying image data read out from the image sensor 111 on the display unit 118 in real time, the image sensor 111 performs a "slit rolling (SR)" operation and a "stop" operation. In the "SR" operation, an "SR readout" operation and/or an "SR reset" operation are performed.

In the "SR readout" operation, pixels are sequentially read out for each row in synchronization with the vertical synchronization signal VD. In the "SR reset" operation, when a count signal (count value) with reference to the vertical synchronization signal VD reaches a preset value, pixel charge is discharged for each row, and then charge is accumulated. In the "SR" operation, the exposure time period of the image sensor 111 is controlled in the interval from the "SR reset" operation to the "SR readout" operation. When only the "SR reset" operation or only the "SR readout" operation is performed, the exposure time period can be appropriately switched by setting a register of the timing control unit 211 from the serial I/F 213.

Figure 6:
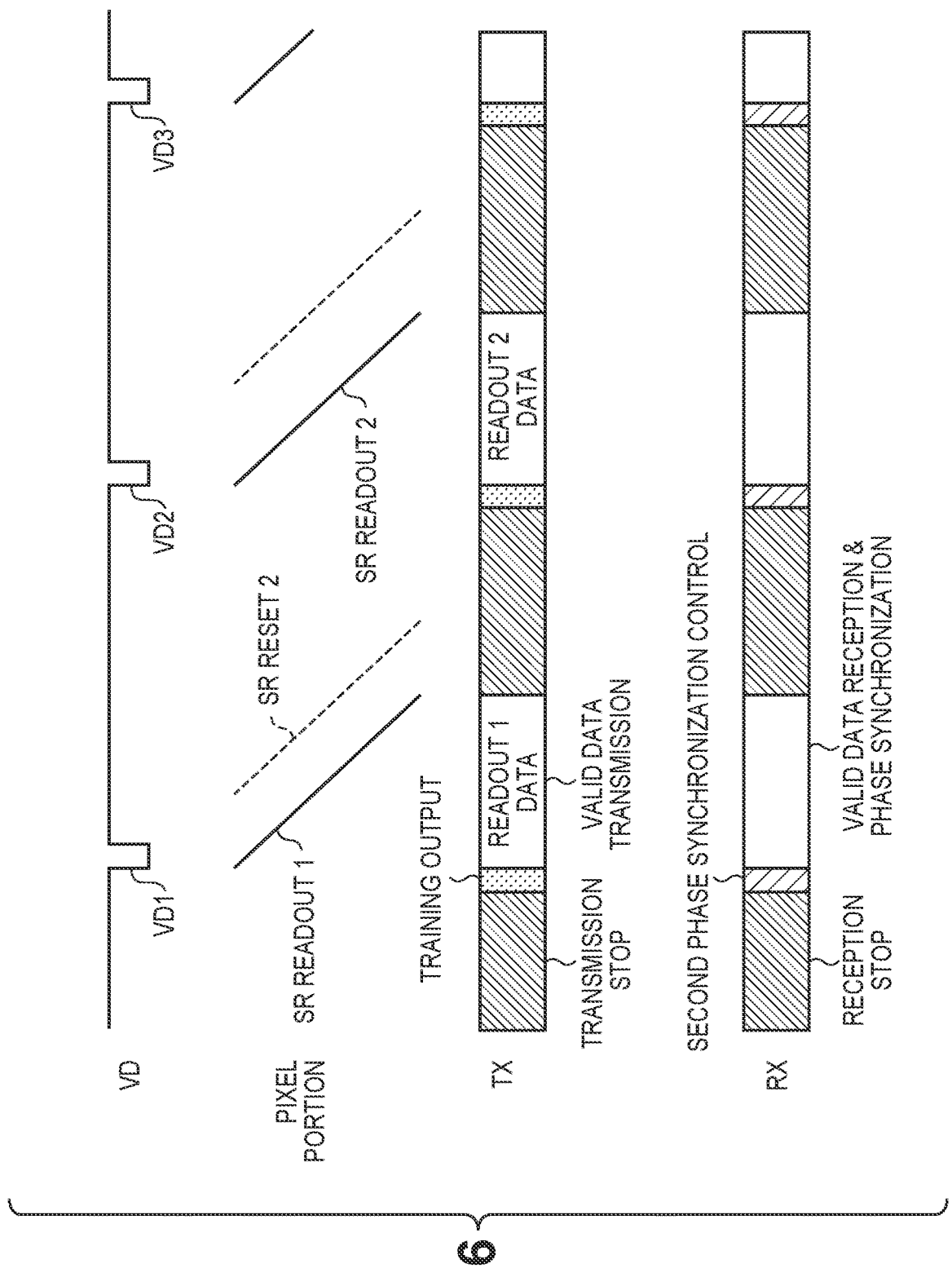
FIG. 6 is a schematic diagram illustrating an operation state of transmission and reception units at a time of moving image shooting.

FIG. 6 is a schematic diagram illustrating driving of the image sensor and transmission and reception units in moving image shooting. In the case of moving image shooting, VD is used as a frame synchronization signal for shooting at regular intervals.

The activation of the image sensor at the time of moving image shooting is performed when the power supply of the image capturing apparatus is turned on by an operation by a user, and the preparation of the transmission and reception units is performed by the first frequency synchronization control in the same manner as for a still image as described above. In moving image shooting or live view driving, the image sensor is caused to perform an "SR" operation to control a signal readout operation (SR readout operation) from pixels in one frame, and a reset operation (SR reset operation) for the next frame. In the present embodiment, a plurality of moving image shooting modes having different numbers of readout pixels or different frame rates are used, and the amount of time required for signal readout is different in each mode.

With FIG. 6, a series of controls in one of these modes will be described in detail. In synchronization with the first vertical synchronization signal VD1 in FIG. 6, the pixel portion 201 of the image sensor 111 performs the first SR readout operation "SR readout 1", and the transmission unit 220 transmits the digital data for each pixel at that time to the reception unit 230. Upon completely receiving data for a number of pixels for a frame, the operation of the reception unit 230 is caused to stop in a non-readout period, and thereafter the operation of the transmission unit 220 is caused to stop.

In the present embodiment, since the clock systems are separate for the vertical read control unit 209 and the transmission and reception units 220 and 230, "SR reset 2" which is the SR reset operation for the next frame can be executed even during a stop time period of the transmission and reception units 220 and 230.

In order to transmit and receive data from the head of the next frame, a setting is made in the immediate reflection register to cause the transmission unit 220 of the image sensor 111 to output a training signal prior to the next vertical synchronization signal VD2. Simultaneously with the reflection of the immediate reflection register, the transmission unit 220 starts outputting the training signal. Thereafter, the camera control unit 114 activates the reception unit 230 and starts the second frequency synchronization control. At this time, the voltage value at the time when the first frequency synchronization control was performed is stored in the storage registers 237, and the reception unit 230 restarts operation in a state close to that at the time of the previous frequency synchronization.

It is assumed that the output of the training signal by the transmission unit 220 is started before the start of the second frequency synchronization control of the reception unit 230. In this manner, when the reception unit 230 can resume operation in a state close to that of the time of the previous frequency synchronization, performing the second frequency synchronization control instead of the first frequency synchronization control can shorten the amount of time until synchronization is possible. Therefore, by performing the second frequency synchronization control, even when the frame rate is high and the interval of data transmission by the image sensor 111 is short, it is possible to stop the transmission and reception units and reduce power consumption.

In the above description, an example of a shooting mode of the image capturing apparatus for illustrating the effect of the present embodiment is shown, and for example, in a shooting mode in which the image data is large and the interval of data transmission by the image sensor is extremely short, the control may be switched for each mode such that the stop/return of the transmission and reception units is not performed, for example.

In addition, the image capturing apparatus performs control for acquiring an image corresponding to a still image by reading out all pixels from live view driving in which a thinned readout is performed from the image sensor. Since a required data slew rate differs between a live view and a still image, the number of transmission lanes connecting the image sensor 111 and the signal processing unit 115 is changed together with the mode change.

Figure 7:
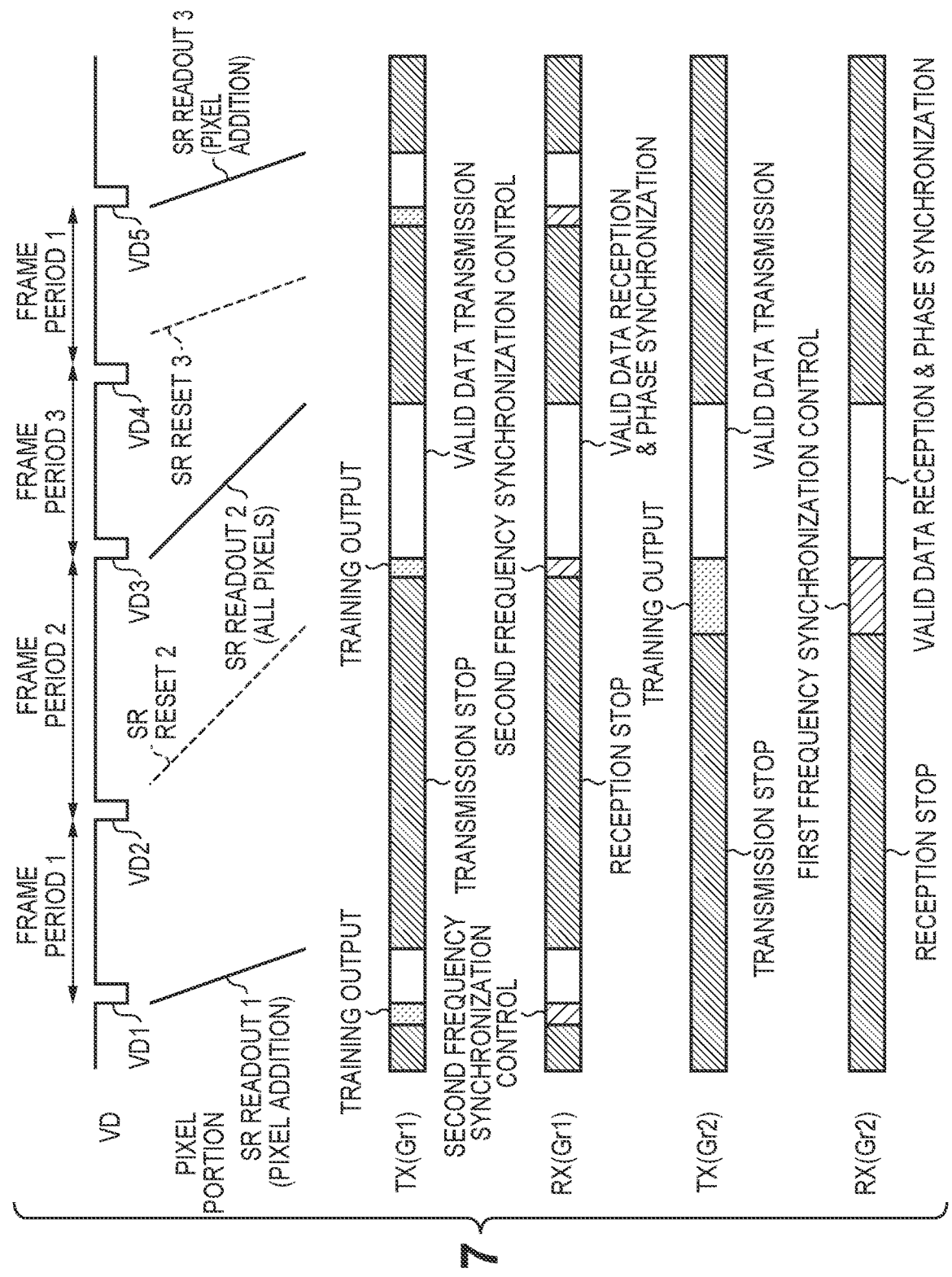
FIG. 7 is a schematic diagram illustrating an operation state of transmission and reception units in a case of switching between two modes having different numbers of transmission lanes.

FIG. 7 is a schematic diagram illustrating an operation state of the transmission and reception units when the method of reading out the pixels of the image sensor is changed halfway and the number of transmission lanes is changed. The transmission unit and the reception unit of a transmission lane commonly used for both of a still image and a live view are denoted by TX (Gr1) and RX (Gr1), respectively, and the transmission unit and the reception unit of a transmission lane used for only a still image are denoted by TX (Gr2) and RX (Gr2), respectively.

As in FIG. 7, the power consumption of the transmission and reception units is suppressed by controlling the number of transmission lanes to be changed in accordance with the shooting mode. In addition, the first frequency synchronization control is performed because the transmission and reception units of a transmission lane used only for the still image are in a stopped state during the live view, and change from the previous frequency synchronization state increases the longer the stopped state continues. A detailed illustration is as follows.

Before the second vertical synchronization signal VD2, an "SR readout" operation for live view driving is performed. As in FIG. 6, in the live-view "SR readout" state, the second frequency synchronization control is performed for each frame with respect to the Gr1 transmission and reception units.

In the time period between the vertical synchronization signals VD2 and VD3, an "SR reset" operation is performed in which only a reset scan of all the pixels is performed. In this section, similarly to a "batch reset accumulation" operation, since the readout of the pixel portion is not performed, the transmission and reception units are stopped regardless of the state of the image sensor before this.

An "SR readout" operation is performed from the next vertical synchronization signal VD3 to read out image data. Therefore, the camera control unit 114 calculates an amount of time required for the completion of the phase synchronization of the reception unit 230, and, in accordance with a timer, sets an immediate reflection register so as that output of the training signal is started prior to VD3, which is the start of readout, by that amount of time.

In order to transmit and receive data from the head of the next frame, control is performed for each transmission lane prior to VD3 which is next, as described below.

In order to synchronize the transmission lanes that were not used in the live view, the camera control unit 114 sets the immediate reflection register so that the training signal is output from TX (Gr2) which is a transmission unit 220 of the image sensor 111. Simultaneously with the reflection of the immediate reflection register, TX (Gr2) which is a transmission unit 220 starts outputting the training signal. Thereafter, the camera control unit 114 activates RX (Gr2) which is a reception unit 230 and causes the first frequency synchronization control to start.

However, to synchronize the transmission lanes that were used in the live view, the camera control unit 114 sets the immediate reflection register so that the training signal is output from TX (Gr1) which is a transmission unit 220 of the image sensor 111. Simultaneously with the reflection of the immediate reflection register, TX (Gr1) which is a transmission unit 220 starts outputting the training signal. Thereafter, the camera control unit 114 activates RX (Gr1) which is a reception unit 230 and starts the second frequency synchronization control.

It is assumed that the outputting of the training signals by TX (Gr1) and TX (Gr2), which are transmission units 220, is started before the frequency synchronization control of RX (Gr1) and RX (Gr2), which are the corresponding reception units 230, is started. The timings of the frequency synchronization control of TX (Gr2) and RX (GR2), which are transmission units 220, may be controlled so as to be in time for the next vertical synchronization signal VD while avoiding congestion of the processing loads of the camera control unit 114 and the signal processing unit 115, and the transmission and reception units are stopped as long as possible.

It is also possible to not start outputting the training signal for each transmission lane as described above. Configuration may be taken to start the output of the training signal of TX (Gr1), which is a transmission unit 220, together with starting the output of the training signal of TX (Gr2) which is a transmission unit 220.

In the time period between the vertical synchronization signals VD3 and VD4, the image sensor 111 performs an "SR readout" operation, and the digital data for each pixel is sequentially read out, and the data is transmitted from the transmission unit 220. When the reception unit 230 completes the data reception, the transmission and reception units are stopped.

In the time period between the vertical synchronization signals VD4 and VD5, an "SR reset" operation for a case of performing a thinned readout of the pixels is performed. Since readout of the pixel portion 201 is not performed, the transmission and reception units can be stopped regardless of the state of the image sensor 111 before this, and power consumption can be reduced.

With the following vertical synchronization signal VD5, an "SR readout" operation is performed, and in order to read out image data, the immediate reflection register is set so as to cause output of the training signal to start before VD5. With the vertical synchronization signal VD5 and thereafter, the second frequency synchronization control is performed for each frame for the Gr1 transmission and reception units in the same manner as with the "SR readout" operation before the vertical synchronization signal VD2.

With such a series of control, when the number of transmission lanes is increased or decreased in accordance with the mode, particularly when the number of transmission lanes is reduced, it is possible to reduce the power consumption of the transmission and reception units of the image sensor 111 and the signal processing unit 115.

As described above, according to the present embodiment, it is possible to effectively reduce power consumption of data transmission between the image sensor 111 and the signal processing unit 115 in accordance with the mode of the image capturing apparatus.

Second Embodiment

In the second embodiment, since the configurations of the image capturing apparatus 100, the image sensor 111, the signal processing unit 115, and the CDR circuit 235 are similar to those in the first embodiment illustrated in FIGS. 1, 2, and 3, description thereof is omitted. In the second embodiment, the voltage of the VCO (voltage controlled oscillator) 305 can be determined from a setting value of the storage registers 237 of the CDR circuit 235 of each transmission lane. By making a setting in the storage registers 237 before activation, operation starts with a VCO voltage corresponding to the setting value.

Further, by the first frequency synchronization control, the second frequency synchronization control, or the transmission and reception of valid data, the storage register is dynamically updated to frequency synchronization information for that point in time, and the VCO voltage for that time can be known by reading the setting value of the storage register.

Before the image capturing apparatus 100 is actually used, the camera control unit 114 performs the first frequency synchronization control on all transmission lanes, and writes the VCO voltage in the synchronization state of the first frequency synchronization control as frequency synchronization information in a flash memory (not illustrated in FIG. 1) for each lane. The frequency synchronization information is information for reproducing the VCO output voltage when all the transmission lanes are set to the synchronization state at the same time. At the next and subsequent activations, by the writing of the frequency synchronization information into the storage register 237 of the CDR circuit 235, the VCO voltage is set to the voltage for when the frequency synchronization information was acquired.

It is assumed that the frequency synchronization information is acquired at the time of manufacturing, and written to the flash memory. However, this may be performed at the time of initial activation of the image capturing apparatus 100 or each time the power supply is turned on.

Figure 8:
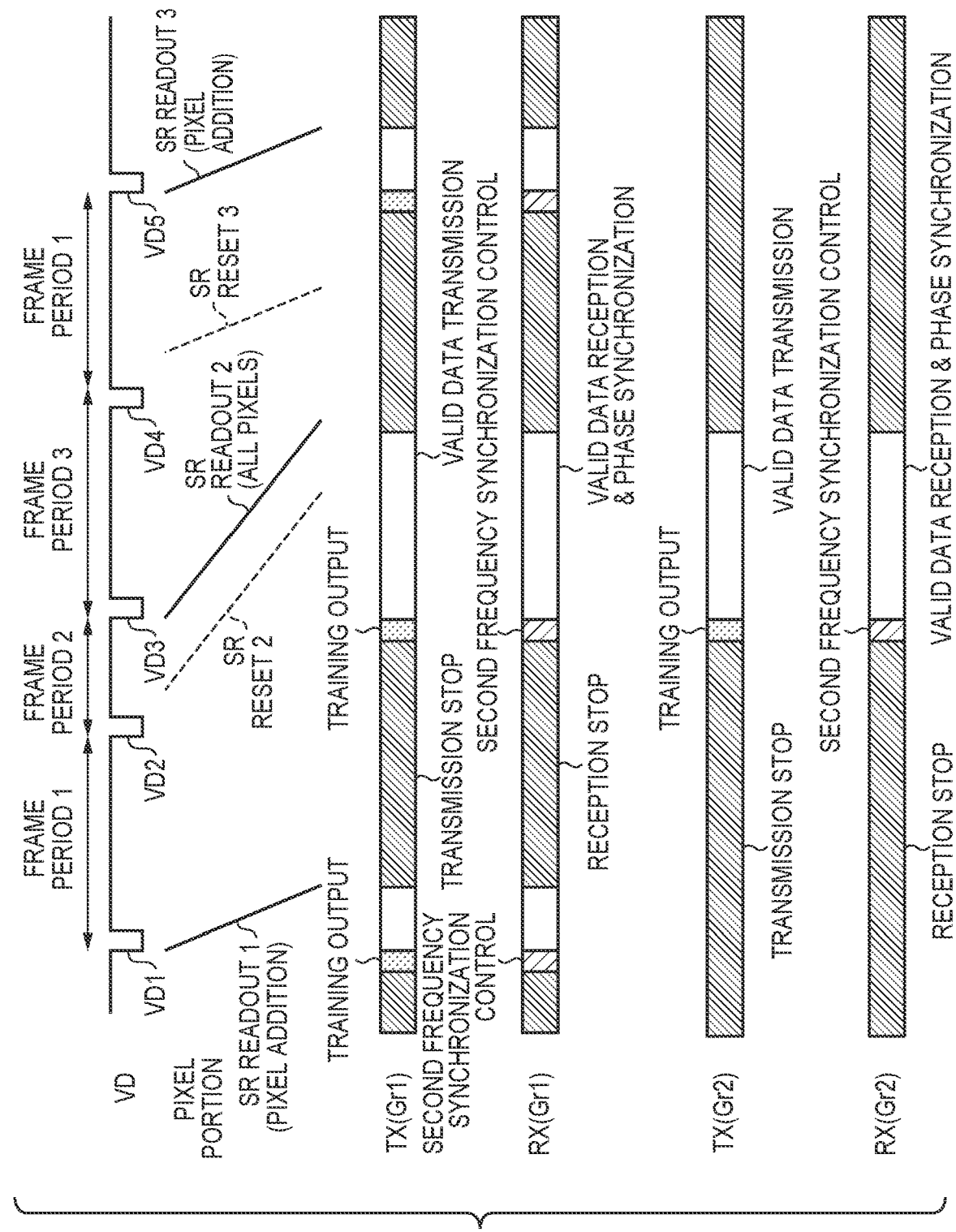
FIG. 8 is a schematic diagram illustrating an operation state of transmission and reception units in a case of switching between two modes having different numbers of transmission lanes, in a second embodiment.

As illustrated in FIG. 8, when a transmission lane is changed according to the mode, the following control is performed.

Similarly to FIG. 7, FIG. 8 schematically illustrates an operation of transitioning from live view driving for performing a thinned readout to control for acquiring an image corresponding to a still image by reading out all pixels.

In FIG. 8, in the transmission lanes that are continuously used regardless of the mode, the frequency synchronization information of the CDR circuit 235 of each lane is dynamically updated. Therefore, by reading out the storage registers 237 and making a comparison with the information stored in the flash memory, it is possible to predict a frequency shift due to environmental temperature or the like. By, with consideration of the predicted shift in frequency, writing to storage registers when a transmission lane that has not been used for a long period of time is restored, the transmission and reception units can be synchronized by the second frequency synchronization control even in such a transmission lane.

Hereinafter, only the difference between the control in FIG. 7 and the control in FIG. 8 will be described. Before the vertical synchronization signal VD2, the "SR readout" operation for live-view driving is performed, and the time period between the vertical synchronization signals VD2 and VD3 has control different to that illustrated in FIG. 7.

In the time period between the vertical synchronization signals VD2 and VD3, the pixel portion is reset row by row as shown by the SR reset 2 in FIG. 8, and a reset scan of all the pixels for still image shooting is performed. A scan of the SR reset 2 is started immediately after the vertical synchronization signal VD2, and by increasing or decreasing the time period of the frame period 2 which is the time period between the vertical synchronization signals VD2 and VD3, the accumulation time period of the still image is decided.

In the time period between the vertical synchronization signals VD2 and VD3, one transmission lane included in the RX (Gr1) which is a reception unit 230 is used as a reference lane, and the storage register information of the reference lane is read out. Next, the frequency synchronization information of each transmission lane is read out from the flash memory. The frequency synchronization information of the reference lane is subtracted from the storage register information of the reference lane to calculate a frequency synchronization correction value. The frequency synchronization correction value is added to the frequency synchronization information of each transmission lane, and is set for the storage registers of each transmission lane.

The camera control unit 114 makes a setting in the immediate reflection register so as to output the training signal to the TX(Gr1) and the TX(Gr2) which are transmission units 220. Simultaneously with the reflection of the immediate reflection register, TX (Gr1) and TX (Gr2) which are transmission units 220 start outputting the training signal.

Thereafter, the camera control unit 114 activates RX (Gr1) and RX (Gr2) which are reception units 230 and starts the second frequency synchronization control. It is assumed that the outputting of the training signals by TX (Gr1) and TX (Gr2), which are transmission units 220, is started before the frequency synchronization control of RX (Gr1) and RX (Gr2), which are reception units 230, is started. The transmission and reception units TX(Gr1) and RX(GR1), TX(Gr2) and RX(GR2) can be uniformly synchronized with the corresponding devices by the second frequency synchronization control.

By virtue of the control of the present embodiment as described above, when the number of transmission lanes is increased, the synchronization state of the transmission and reception units can be restored in a short time, and the frame period for deciding an accumulation time period for a still image can be set short.

Note that this embodiment is an example, and can be applied to the case where the accumulation time period of a still image is controlled in a form different from that of this embodiment.

Third Embodiment

In the third embodiment, since the configurations of the image capturing apparatus 100, the image sensor 111, the signal processing unit 115, and the CDR circuit 235 are similar to those in the first embodiment illustrated in FIGS. 1, 2, and 3, description thereof is omitted. In the first embodiment, as described with reference to FIGS. 5 and 6, the transmission unit 220 of the image sensor 111 needs to output a training signal before frequency synchronization control of the reception unit. In the image capturing apparatus 100, the timing of image capturing control is synchronized in accordance with a vertical synchronization signal VD and a horizontal synchronization signal HD between the image sensor 111 and the camera control unit 114.

The vertical synchronization signal VD is a synchronization signal for synchronizing the start of the next operation and the start of the readout of the pixels of one frame, between the image sensor 111 and the camera control unit 114. The horizontal synchronization signal HD is a synchronization signal for synchronizing the start of readout of pixels of one line.

The camera control unit 114 has an HD counter for counting falling edges of the horizontal synchronization signal, and can issue an interrupt signal when a preset number of falling edges are detected. The camera control unit 114 can start predecided control by using the interrupt signal issued by the HD counter as a trigger.

Figure 9:
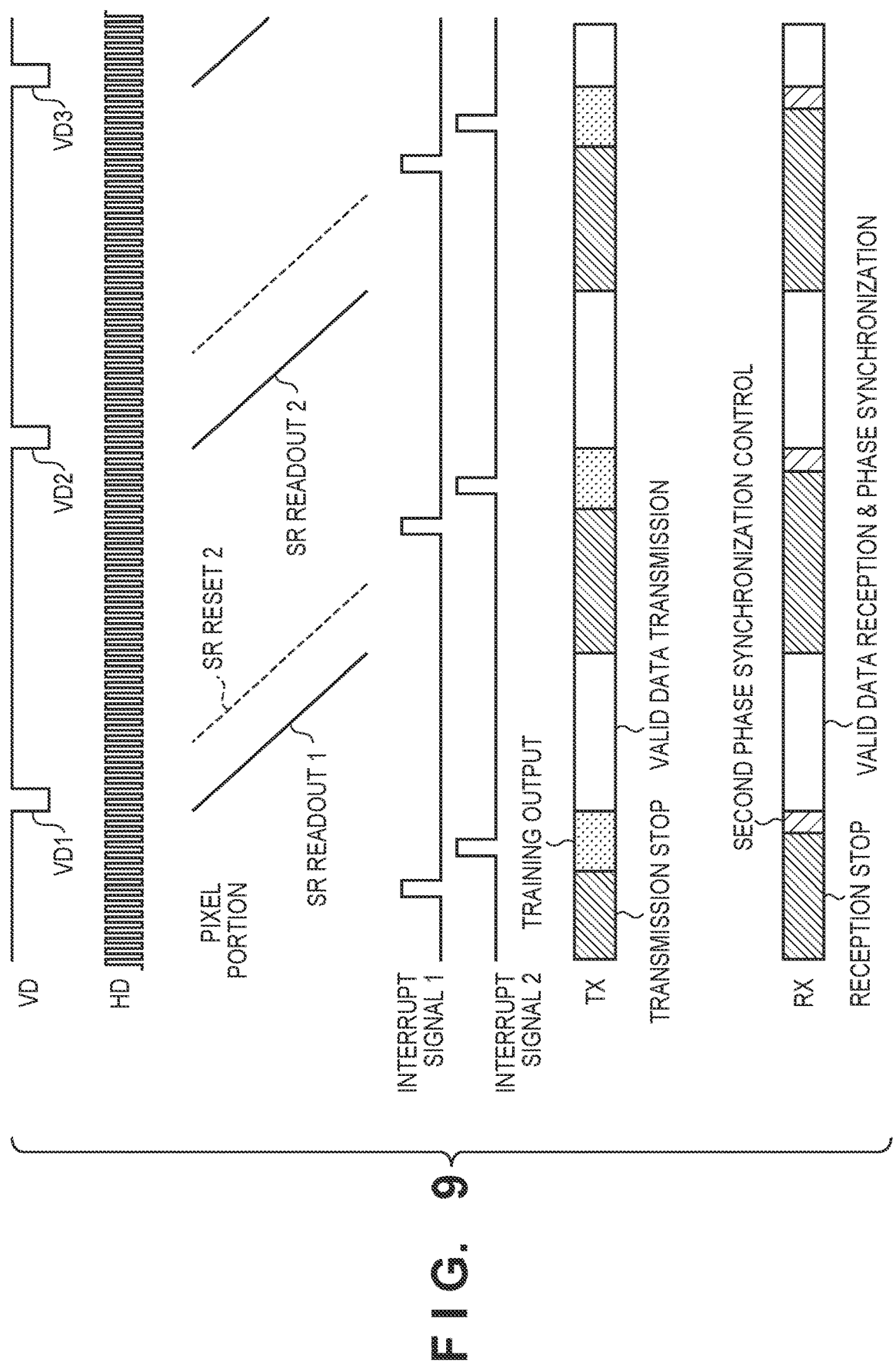
FIG. 9 is a schematic diagram illustrating that frequency synchronization control is performed by an interrupt signal issued by counting falling edges of a horizontal synchronization signal during moving image shooting in a third embodiment.

FIG. 9 is a schematic diagram illustrating that frequency synchronization control is performed by an interrupt signal issued by counting falling edges of a horizontal synchronization signal during moving image shooting.

With FIG. 9, similarly to in FIG. 6, for each frame, the image sensor is caused to perform an "SR" operation to control a signal readout operation (SR readout operation) from pixels in one frame, and a reset operation (SR reset operation) for the next frame. Upon completely receiving data for a number of pixels for a frame, the operation of the reception unit 230 is caused to stop, and thereafter the operation of the transmission unit 220 is caused to stop.

In order to read out the next frame, the HD counter of the camera control unit 114 sets a first timing at which the training signal is output from the transmission unit 220 and a second timing at which the reception unit 230 starts the second frequency synchronization control.

When the number of detected HD falling edges of the HD counter coincides with the first timing, the HD counter issues an interrupt signal 1. In accordance with the interrupt signal 1, the camera control unit 114 sets the image sensor 111 to start output of the training signal, and the output of the training signal is started. When the number of detected falling edges of the HD of the HD counter coincides with the second timing, the HD counter issues an interrupt signal 2. In accordance with the interrupt signal 2, the camera control unit 114 sets the reception unit 230 to start the second frequency synchronization control, and executes the second frequency synchronization control.

By using interrupt signals of the HD counter, it is possible to perform frequency synchronization control in synchronization with the operation state of the image sensor 111. Therefore, even in a mode in which the readout interval of the image sensor is shorter than in non-synchronized control by timer processing or the like, stop and return control of the transmission and reception units can be performed.

In the present embodiment, the moving image shooting has been described as an example, but at a time of still image shooting, by setting the first timing and the second timing to the HD counter in accordance with the accumulation time period, frequency synchronization control of the transmission and reception units can be performed before valid data is read out.

Further, although an example has been described in which the timing is controlled by detecting the falling edges of the horizontal synchronization signal HD, a synchronization signal for another purpose may be used as long as the timing at which the next state transition is started can be measured, and a detected polarity can take various forms.

By virtue of the control of the present embodiment, it is possible to reduce the power consumption of the data transmission between the image sensor 111 and the signal processing unit 115 even in a mode in which the readout interval of the image sensor is short.

Fourth Embodiment

In the fourth embodiment, since the configurations of the image capturing apparatus 100, the image sensor 111, and the signal processing unit 115, are similar to those in the first embodiment illustrated in FIGS. 1, and 2, description thereof is omitted.

Figure 10:
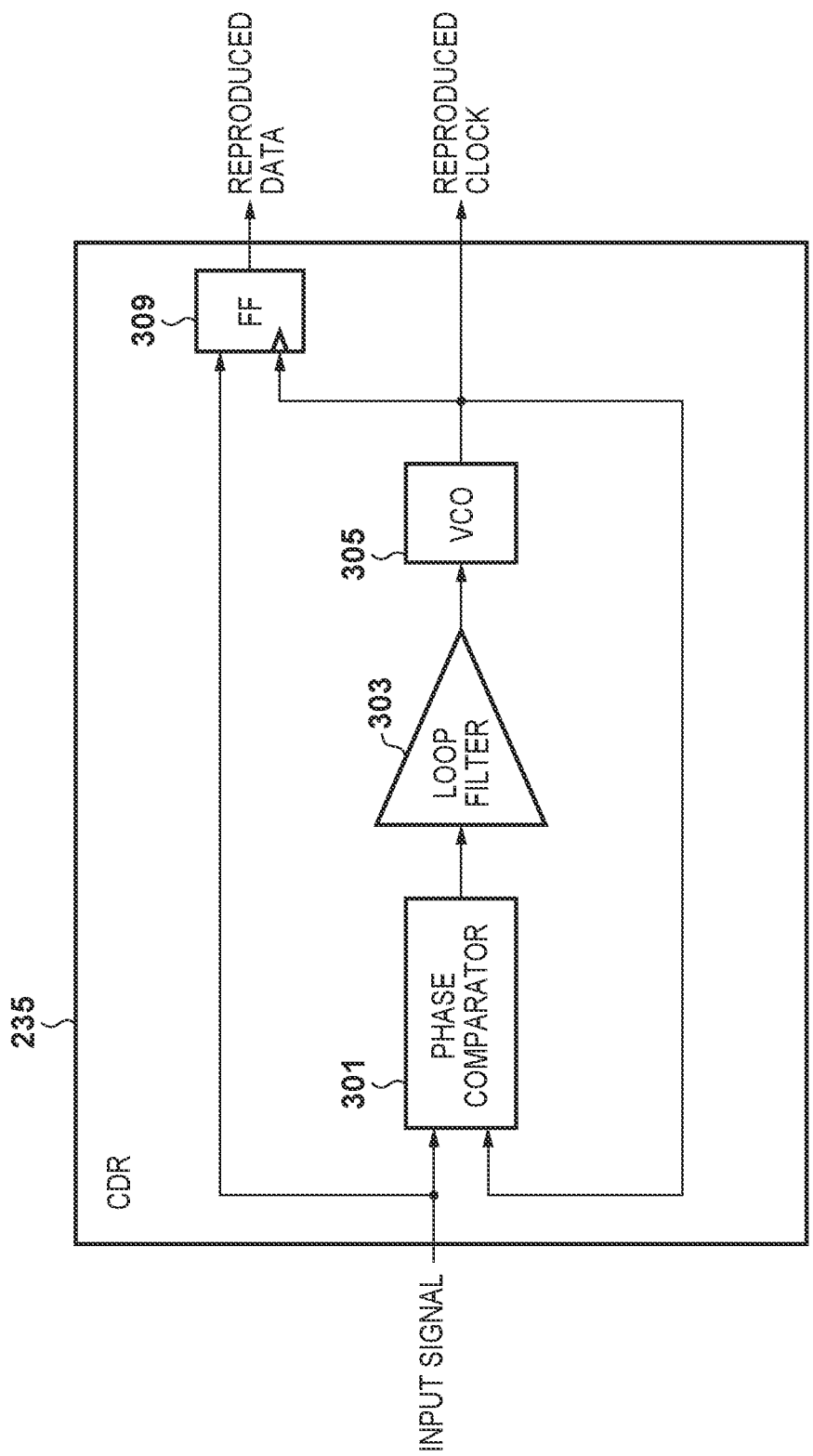
FIG. 10 is a block diagram illustrating a configuration of a CDR circuit according to the fourth embodiment.

FIG. 10 is a block diagram illustrating a configuration of the CDR circuit 235 according to the fourth embodiment. In FIG. 10, the CDR circuit 235 includes a phase comparator 301, a loop filter 303, a VCO (voltage controlled oscillator) 305, and a flip-flop 309.

The phase comparator 301 compares the phase of a clock outputted by the VCO 305 with a data edge of an input signal, and outputs a voltage value corresponding to a phase difference. The loop filter 303 smooths the signal output by the phase comparator 301 in alignment with an input voltage amplitude range and a response speed of the VCO 305, and amplifies the voltage of the output signal. The VCO 305 outputs a clock having a frequency in accordance with the voltage amplitude of the loop filter 303 that was inputted. The output clock of the VCO 305 is fed back to the phase comparator 301 to synchronize with the input signal.

For the CDR circuit 235, what frequency and phase data is input in an initial state are unknown, and synchronization cannot be correctly performed, so it is necessary to receive a training signal from the transmission unit 220 when activated, and synchronize frequency and phase.

The training signal is a signal in which a HIGH level and a LOW level are outputted in a particular pattern. The clock outputted by the VCO 305 in a state where synchronization with the training signal is obtained is referred to as a reproduced clock, and the reproduced clock is supplied to the flip-flop 309 to which the received signal is inputted, so that data can be extracted from the received signal.

As described above, after synchronization is obtained by the training signal, transmission of valid data from the transmission unit 220 starts, and the data is extracted. The data reproduced from the serial data on which the clock and the data are overlapped by the CDR circuit 235 is referred to as reproduced data.

While the reception unit 230 is receiving valid data, the data edges of the input signal and the phase of the reproduced clock described above are detected, and by performing synchronization control, even if the frequency or the phase shifts due to a temperature change or the like during a data transmission, it is possible to track this fluctuation and maintain the synchronization state.

Unlike the training signal described above, in generic serial data such as image data, because there are cases where HIGH or LOW signals are consecutive and pulse edges cannot be detected, synchronization may be lost if such a state continues for a long time.

Usually, in order to avoid such a problem, prior to transmitting the data obtained by overlapping the clocks and the data from the transmission unit 220, for example, a process such as "8b/10b conversion" is performed. 8b/10b conversion is data conversion in which 8-bit data is converted into 10-bit data and HIGH or LOW signals are set to 4 clocks or less. Rather than transfer efficiency of valid data decreasing, it is possible to detect a pulse edge by the reception unit, and robustness against frequency fluctuation is improved. It should be noted that the data obtained by the 8b/10b conversion needs to be decoded by the reception unit 231. Such processing is performed by blocks (not shown) in the transmission unit 220 of the image sensor 111 and the reception unit 230 of the signal processing unit 115.

A similar technique is "128b/130b conversion" in PCI EXPRESS 3.0/4.0, in which 128-bit valid data is caused to have a 2-bit preamble signal so that HIGH or LOW signals do not continue for a long period of time. Also, in the present embodiment, there is no limitation to "8b/10b conversion" and a conversion process having similar effects to those described above may be used.

As described above, once synchronization can be achieved between transmission and reception units, phase synchronization can be achieved as long as data transmission continues. However, in the image capturing apparatus, power consumption may be reduced by causing the transmission and reception units to be idle when not during readout of the image sensor.

Hereinafter, description will be given regarding control for reducing power consumption by transmission and reception units in various modes of the image capturing apparatus.

Figure 11:
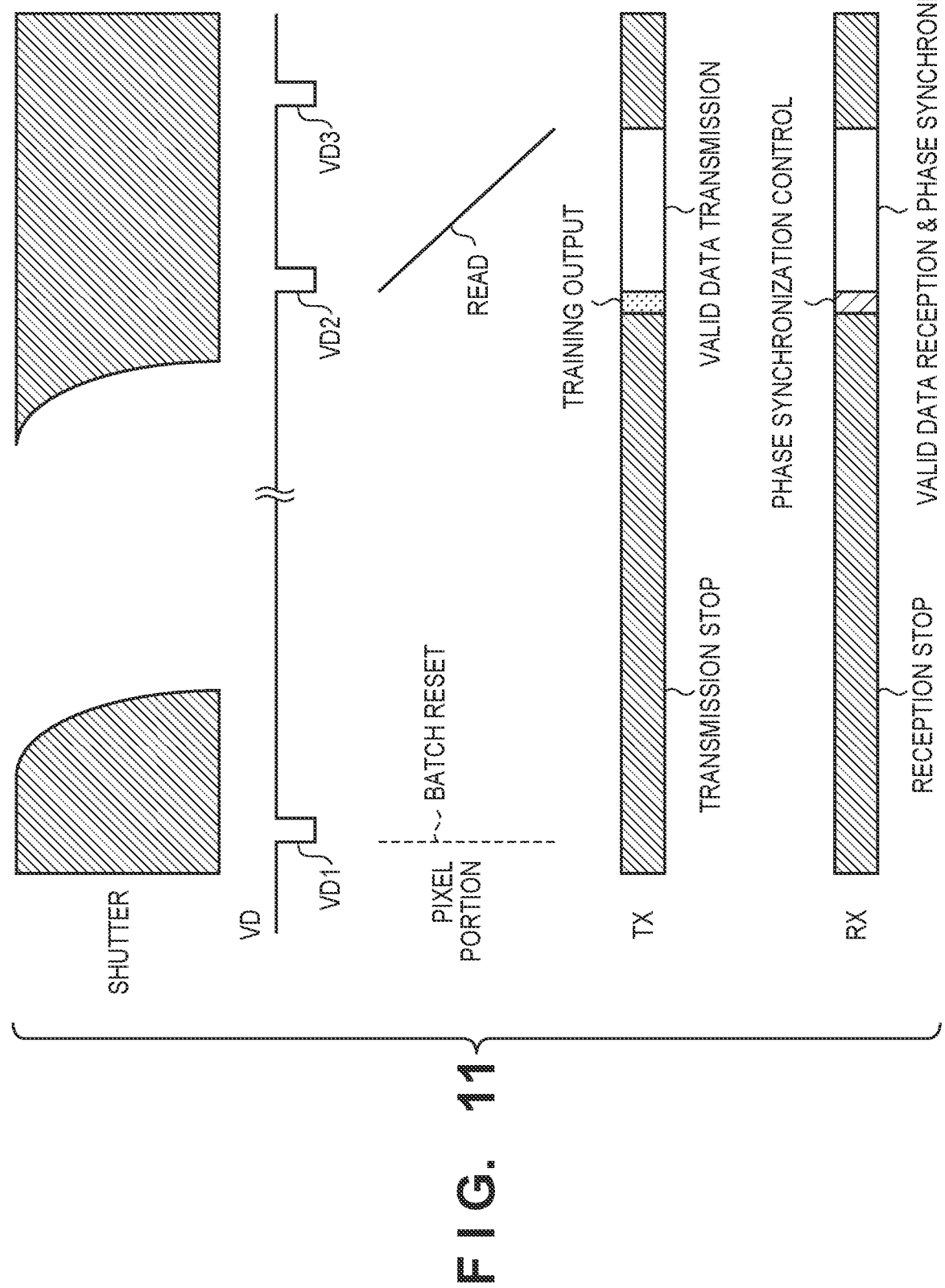
FIG. 11 is a schematic diagram illustrating an operation state of transmission and reception units at a time of still image shooting.

FIG. 11 is a schematic diagram illustrating driving of the image sensor 111 and transmission and reception units in still image shooting by the image capturing apparatus 100. A user operates the shooting start button of the image capturing apparatus 100 to start still image shooting. FIG. 11 illustrates the passage of time from a state where preparation for shooting (such as energization of the shutter, charging, and an activation sequence including the image sensor) is complete, which is after the operation of the shooting start button.

The camera control unit 114 supplies control signals to the image sensor 111 and performs register setting via the serial I/F 213, thereby appropriately changing the state of the image sensor 111, controlling accumulation and readout required for shooting, and controlling the operation of the transmission unit 220. The image sensor 111 can accept a digital value from the outside through the serial I/F 213 and store the digital value in a register (not shown) to thereby reflect the content of the register in an operation. The registers 237 have an "immediate reflection register" which is reflected immediately after a digital value is written, and a "VD synchronization register" which is reflected in synchronization with a falling edge of the vertical synchronization signal VD which is the synchronization signal for a state transition of the image sensor 111. By making an assignment so that something that needs to be changed at the time of a state transition is stored in the "VD synchronization register", the change content for the state transition can be collectively reflected to registers in synchronization with the vertical synchronization signal VD regardless of a setting order or the like. In addition, in the present embodiment, the "immediate reflection register" is used as the register involved in the control of the transmission and reception units in order to immediately reflect the state of the activation or stoppage of the image capturing apparatus.

In order to perform still image shooting, the image sensor performs the operations of "accumulation", "readout", and "stop". The "accumulation" operation is an operation in which, charge is discharged collectively by the photodiodes of all the pixels of the pixel portion 201 of the image sensor 111, and after that, charge accumulation is performed. In the "readout" operation, charge that was accumulated in the photodiodes before transitioning to this operation is transferred row by row to the column circuit 203, an analog-to-digital conversion is performed, and then a result of the analog-to-digital conversion is sent from the horizontal transfer circuit 205 to the digital processing unit 207. The digital processing unit 207 performs clamp processing and gain processing. The "stop" operation is an operation that stops the clock supply in the image sensor 111. In still image shooting, the operations of "accumulation", "readout", and "stop" of the image sensor are sequentially executed to thereby obtain image data from charge accumulated in the "accumulation" operation.

The vertical synchronization signal VD illustrated in FIG. 11 is a control signal for causing the image sensor 111 to perform a state transition, and in the present embodiment, the falling of a vertical synchronization signal VD pulse is detected, and the setting set in the VD synchronization register at that time is reflected to the circuit to perform a state transition. In a state in which preparation for shooting is complete, the transmission and reception units are both are in the stopped state, and power is not consumed.

By setting the register of the image sensor 111 to have a setting for causing the "accumulation" operation to be performed prior to the first vertical synchronization signal VD1 in FIG. 11, all the pixels are collectively reset in synchronization with the vertical synchronization signal VD1, and accumulation is started upon release of the reset. Thereafter, the camera control unit 114 controls the opening and closing of the shutter 113 in accordance with the accumulation time period.

With the second vertical synchronization signal VD2 after the shutter is closed, the image sensor 111 is caused to perform a "readout" operation, and the digital signals read out from the pixels are sequentially outputted from the transmission unit 220. The camera control unit 114 performs a setting, with respect to the register of the image sensor 111, for causing a training signal to be outputted from the transmission unit 220 prior to the vertical synchronization signal VD2 for causing readout to start, and simultaneously starts phase synchronization with the reception unit 230 of the signal processing unit 115.

In addition, the phase synchronization of the reception unit 230 requires a finite period of time to end in order to, for example, wait for stabilization of the clock outputted by the VCO 305. In the meantime, it is necessary to secure the output of the training signal until the completion of the synchronization of the reception unit 230 is guaranteed. Therefore, the camera control unit 114 makes a conversion to an amount of time required for the completion of the phase synchronization of the reception unit, and, in accordance with a timer, sets an immediate reflection register for the start of output of the training signal before VD2, which is the start of readout, by that amount of time. Simultaneously with the reflection of the immediate reflection register, the transmission unit 220 starts outputting the training signal. Thereafter, the camera control unit 114 causes the reception unit 230 to activate and phase synchronization to start.

With the vertical synchronization signal VD 2, the image sensor 111 is caused to perform a "readout" operation, the digital data for each pixel is sequentially read out, and the data is transmitted from the transmission unit 220. Upon completely receiving data for a number of pixels, the operation of the reception unit 230 is caused to stop, and thereafter the operation of the transmission unit 220 is caused to stop. The third vertical synchronization signal VD3 serves as a trigger for causing the image sensor 111 to perform a "stop" operation after the control related to the sequence of data transmission and reception described above is completed.

In the present embodiment, the image sensor 111 performs the "slit rolling (SR)" operation and the "stop" operation in order to perform the moving image shooting operation or the live view operation of displaying the captured image on the display unit 118 in real time.

In the "SR" operation, the "SR readout" operation and/or the "SR reset" operation are performed. In the "SR readout" operation, pixels are sequentially read out for each row in synchronization with the vertical synchronization signal VD. In the "SR reset" operation, when a count signal with reference to the vertical synchronization signal VD reaches a preset value, pixel charge is discharged for each row, and then charge is accumulated.

In the "SR" operation, the exposure time period of the image sensor is controlled in the interval from the "SR reset" operation to the "SR readout" operation. When only the "SR reset" operation or only the "SR readout" operation is performed, the exposure time period can be appropriately changed by setting a register of the timing control unit 211 from the serial I/F 213.

Figure 12:
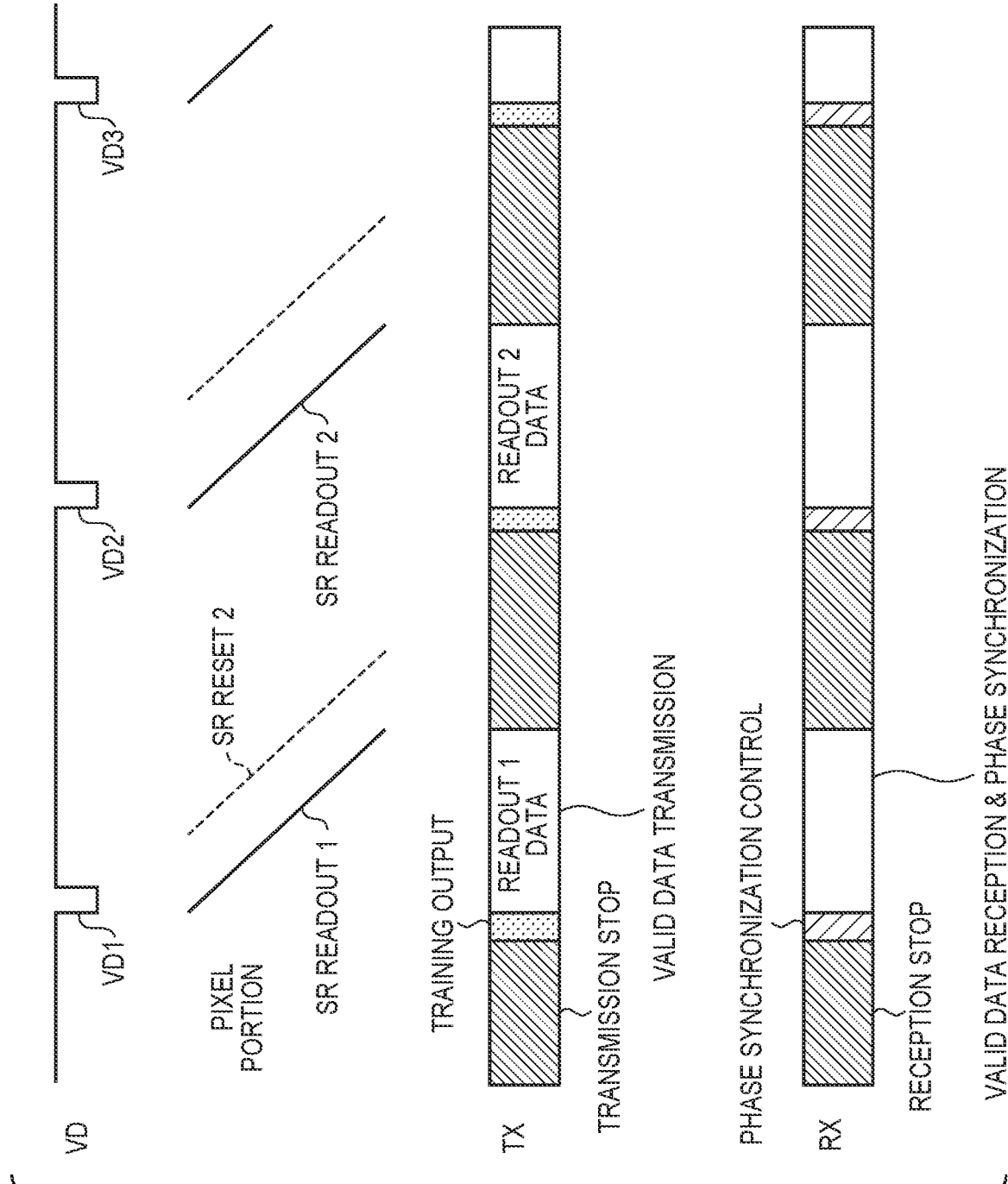
FIG. 12 is a schematic diagram illustrating an operation state of transmission and reception units at a time of moving image shooting.

FIG. 12 is a schematic diagram illustrating driving of the image sensor 111 and transmission and reception units in moving image shooting. In the case of moving image shooting, the vertical synchronization signal VD is used as a frame synchronization signal for shooting at regular intervals. In moving image shooting operation or live view operation, the image sensor 111 is caused to perform an "SR" operation to control a signal readout operation (SR readout operation) from pixels in one frame, and a reset operation (SR reset operation) for the next frame. In the present embodiment, a plurality of moving image shooting modes having different numbers of readout pixels or different frame rates are used, and the amount of time required for signal readout is different in each mode.

With FIG. 12, a series of controls in one of these modes will be described in detail. In synchronization with the first vertical synchronization signal VD1 illustrated in FIG. 12, the pixel portion 201 of the image sensor 111 performs the first SR readout operation "SR readout 1", and the transmission unit 220 transmits the digital data for each pixel at that time to the reception unit 230. Upon completely receiving data for a number of pixels for a frame, the operation of the reception unit 230 is caused to stop, and thereafter the operation of the transmission unit 220 is caused to stop.

In the present embodiment, since the clock systems are divided between the vertical read control unit 209 and the transmission and reception units 220 and 230, it is possible to scan the pixel portion 201 by "SR reset 2" which is the SR reset operation for the next frame, even during a stop time period of the transmission and reception units. The camera control unit makes a conversion to the amount of time required for the completion of the phase synchronization of the reception unit 230, and, in accordance with a timer, makes a setting, in the immediate reflection register, for output of the training signal to start before the next vertical synchronization signal VD2 by that amount of time. Simultaneously with the reflection of the immediate reflection register, the transmission unit 220 starts outputting the training signal.

Thereafter, the camera control unit 114 causes the reception unit 230 to activate and phase synchronization to start. By repeating this series of controls, it is possible to suppress power applied to the transmission and reception units during a period of time that is unnecessary for data transfer at a time of moving image shooting.

However, when the frame rate is high and the amount of time required for readout is long with respect to the frame period, there may be cases where a time period required for completing phase synchronization cannot be secured within the time period from the completion of readout to the next VD.

Figure 13:
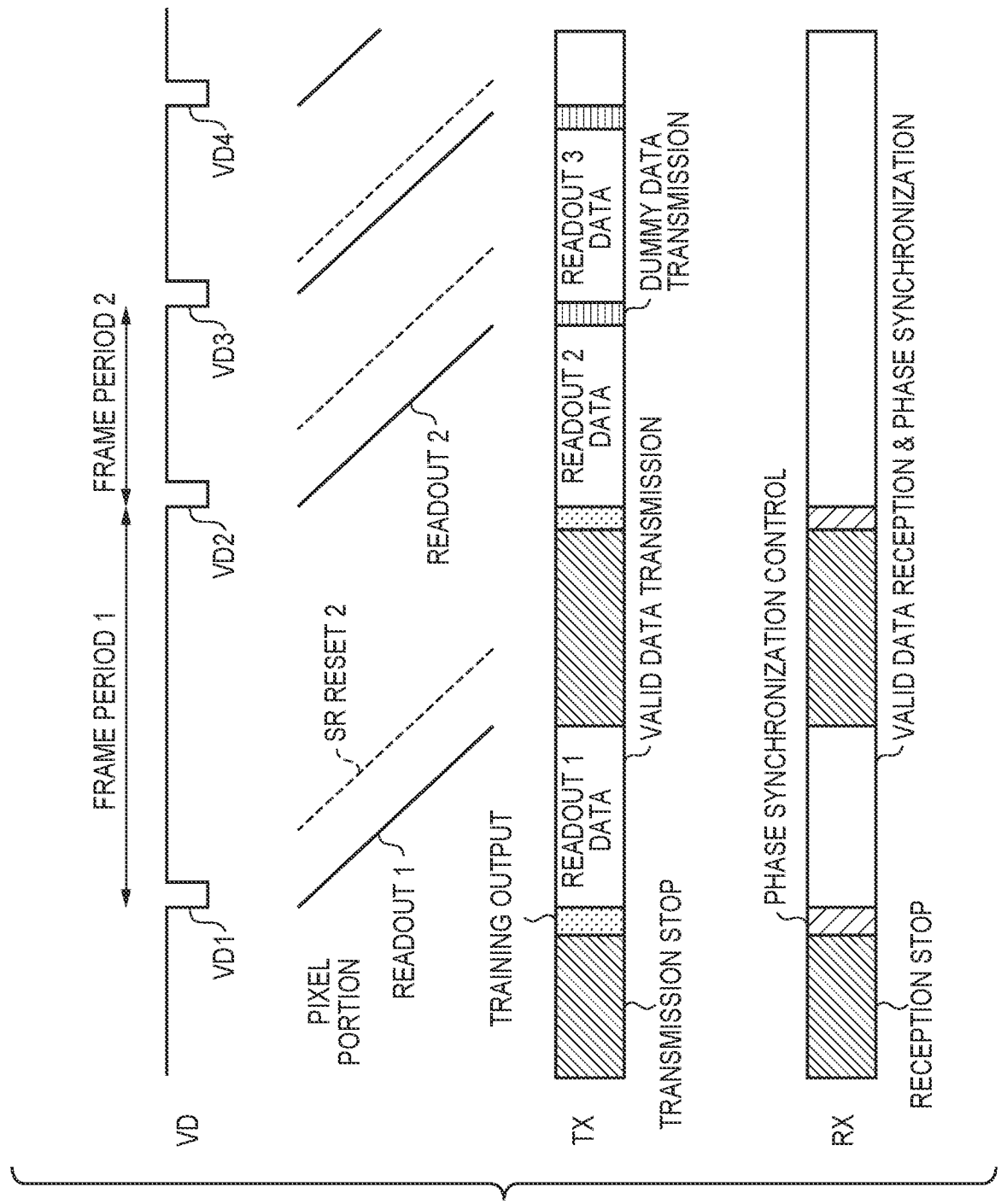
FIG. 13 is a schematic diagram illustrating an operation state of transmission and reception units when the frame rate is changed during moving image shooting.

FIG. 13 is a schematic diagram illustrating an operation state of the transmission and reception units when the frame rate is changed during moving image shooting, and stop control of the transmission and reception units according to the frame rate will be described with reference to this diagram.

The "frame period 1" in FIG. 13 indicates a frame period in which an amount of time required for phase synchronization complete can be secured, and the "frame period 2" indicates a frame period in which an amount of time required for phase synchronization completion cannot be secured.

When there is a change from the moving image shooting state of "frame period 1" which is similar to that of FIG. 12 to the shooting state of the "frame period 2", the transmission/reception circuits are not stopped after the readout is completed, and the transmission unit 220 transmits dummy data after the data transmission for a number of pixels is completed. The dummy data may be arbitrary data, and may be a training signal, for example. Whether or not stop control of the transmission and reception units is performed is determined by the length of a blanking period obtained by subtracting the amount of time required for readout from the frame period. The amount of time required for readout differs in accordance with the moving image shooting mode, and the blanking period is decided by the moving image shooting mode and the frame rate.

Specifically, the camera control unit 114 calculates a blanking time period from the operation mode and the frame rate, performs the aforementioned stop control and synchronization control at the time of restoration only when the blanking time period is greater than or equal to a predetermined length, and performs neither stop control nor synchronization control in other cases.

In addition, the image capturing apparatus 100 performs control for acquiring an image corresponding to a still image by reading out all pixels from live view driving in which a thinned readout is performed from the image sensor 111.

Figure 14:
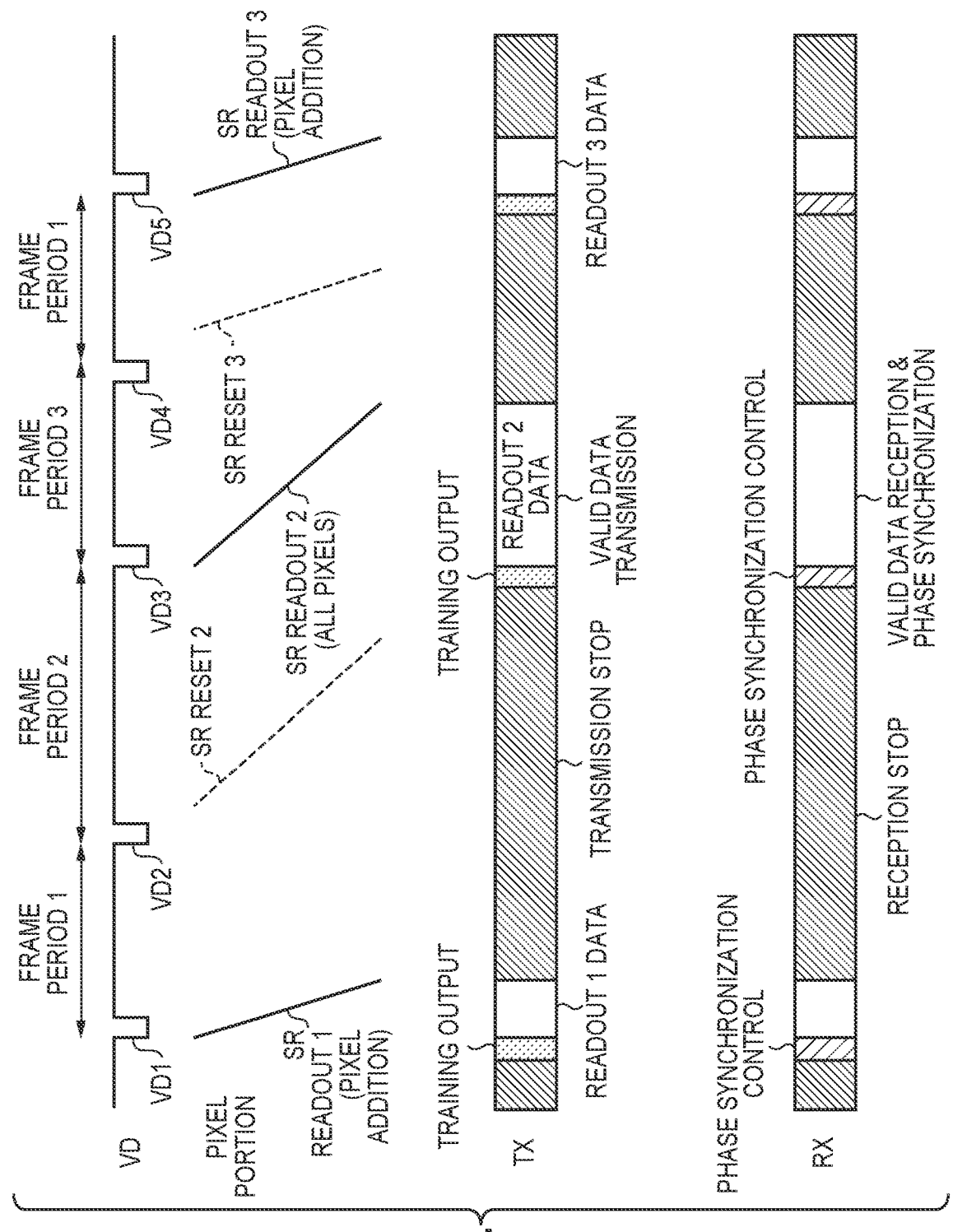
FIG. 14 is a schematic diagram illustrating an operation state of transmission and reception units in a case of switching between two modes having different readout methods.

FIG. 14 is a schematic diagram illustrating an operation state of the transmission and reception units when the method of reading out the pixels of the image sensor 111 is changed halfway. By switching the operation of the image sensor 111 in each section in FIG. 14 and changing the control of the transmission and reception units according to the operation of the image sensor 111, the transmission and reception units are controlled so as to suppress power consumption in such a state transition of the image sensor.

Before the second vertical synchronization signal VD2, an "SR readout" operation for live view driving is performed. As in FIGS. 12 and 13, in the "SR readout" state, a threshold value for each mode is set with respect to the frame period, the camera control unit 114 determines whether or not the frame period is equal to or greater than the threshold value, and when the frame period is equal to or greater than the threshold value, performs stop control and phase synchronization control of the transmission and reception units.

In the time period between the vertical synchronization signals VD2 and VD3, an "SR reset" operation is performed in which only a reset scan of all the pixels is performed. In this section, similarly to a "batch reset accumulation" operation, since the readout of the pixel portion is not performed, the transmission and reception units are stopped regardless of the state of the image sensor before this.

In order to perform the "SR readout" operation from the following vertical synchronization signal VD3 and read out the image data, the camera control unit 114 calculates the amount of time required for completion of the phase synchronization of the reception unit 230, and, by a timer, makes a setting in the immediate reflection register for the start of the output of the training signal that amount of time before the vertical synchronization signal VD3 for starting the readout. In the time period between the vertical synchronization signals VD3 and VD4, the image sensor 111 performs an "SR readout" operation, and the digital data for each pixel is sequentially transmitted from the transmission unit 220 to the reception unit 230.

In the time period between the vertical synchronization signals VD4 and VD5, an "SR reset" operation, which is a reset scan for a case of performing a thinned readout of the pixels, is performed. Since readout of the pixel portion is not performed, the transmission and reception units are stopped regardless of the previous state of the image sensor.

With the following vertical synchronization signal VD5, an "SR readout" operation is performed, and in order to read out image data, the immediate reflection register is set so as to cause output of the training signal to start before the vertical synchronization signal VD5. After the vertical synchronization signal VD5, control for performing the "SR readout" operation, referring to the frame period 1 and the threshold value, deciding the amount of time for restoring the transmission and reception units, stopping the transmission and reception units, and starting output of the training signal prior to the next vertical synchronization signal VD is repeated.

By the above-described series of control, even when the readout method of the pixels of the image sensor 111 is changed part way through, it is possible to reduce power consumption by causing the transmission and reception units to stop except when data transfer is necessary.

Fifth Embodiment

Regarding the phase synchronization control of the transmission and reception units in the fourth embodiment, since a unique phase synchronization time period sufficient for phase synchronization to complete is assumed, the same time period is always required when obtaining phase synchronization from the stopped state. However, because as the frame period with respect to the readout time is shortened, the stop time period of the transmission and reception units is shortened, and it ceases to be possible to achieve a power reduction effect for a moving image of a high frame rate in which the power consumption is increased.

In the CDR circuit of the fifth embodiment, the loop filter 303 of FIG. 3 is provided with a voltage holding circuit, and voltage holding and release of voltage holding are controlled by a control signal from the camera control unit 114. After the completion of synchronization control in accordance with the training signal and before the stoppage of the transmission unit 220, the voltage at that time is held, and this voltage is inputted to the VCO 305 at the time of restoration. Thus, synchronization control can be started from a state in which the phase difference with a received signal is small, and the amount of time required for phase synchronization can be shortened. When the phase synchronization control is performed, the voltage holding of the loop filter 303 is released after a signal from the transmission unit 220 is input. In this control, it is not possible to completely stop the reception unit 230, but it is possible to stop the operation of the transmission unit 220.

Figure 15:
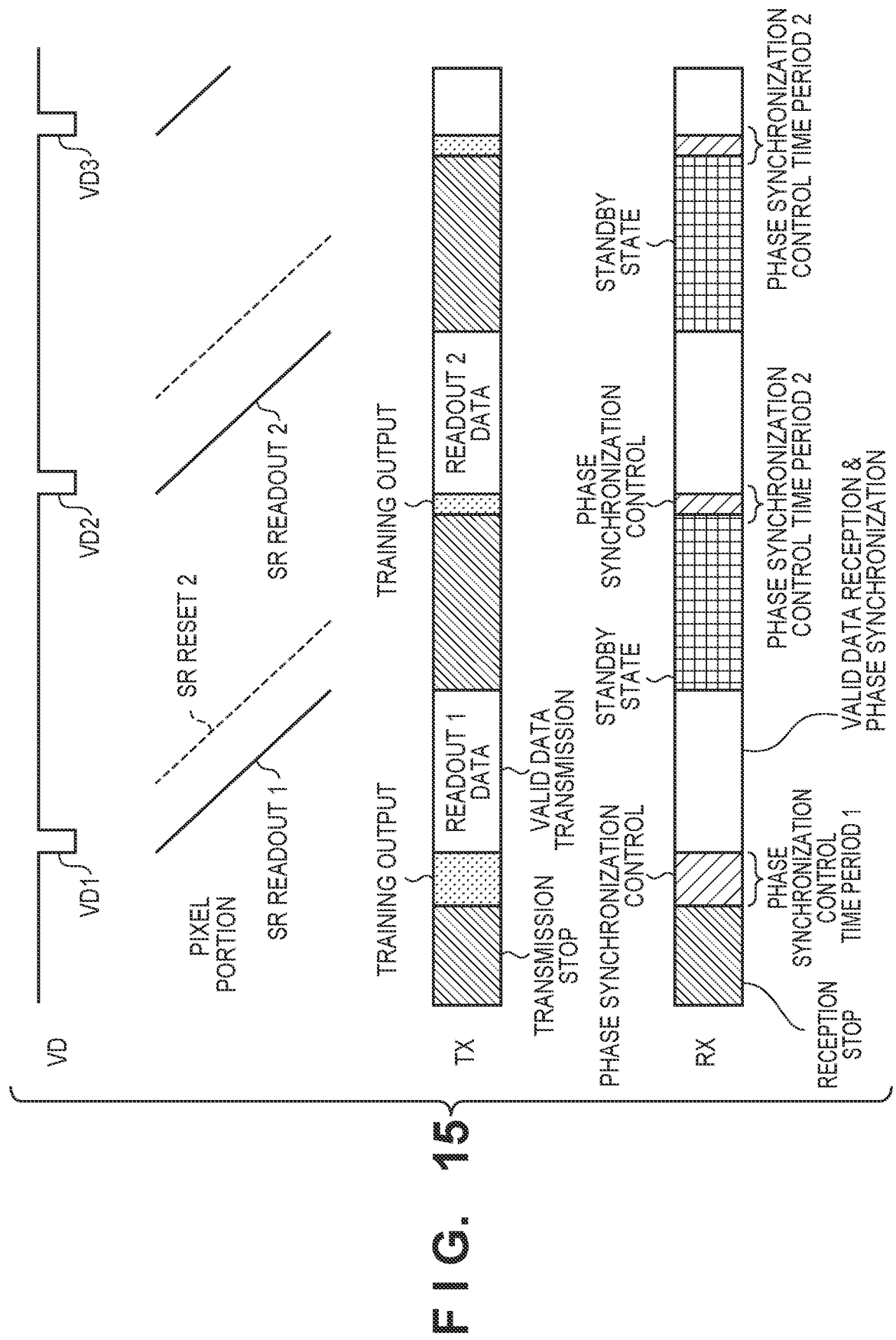
FIG. 15 is a schematic diagram illustrating control for causing a reception unit to transition from a standby state to a phase synchronization state.

FIG. 15 is a schematic diagram illustrating control in the case of performing phase synchronization from the above-mentioned standby state. The first vertical synchronization signal VD1 in FIG. 15 is a vertical synchronization signal that is first inputted when both the transmission unit 220 and the reception unit 230 are in a stopped state.

When the reception unit 230 is in the stopped state, prior to the reception of the data of the SR readout 1 of the image sensor 111 which is started from the vertical synchronization signal VD1, in the same manner as in the fourth embodiment, the training output for a predetermined time period is received and the phase synchronization control is performed. A time period required for the phase synchronization control at this time is referred to as a phase synchronization control time period 1.

Thereafter, when the reception of the data of the SR readout 1 is completed, the voltage of the loop filter 303 is held in accordance with the control signal from the camera control unit 114. Thereafter, the transmission unit 220 is caused to stop, and the reception unit 230 is caused to stand by in the voltage holding state. When the time period required for restoring the reception unit 230 from the standby state is the phase synchronization control time period 2, the phase synchronization control time period 2 becomes shorter than the phase synchronization control time period 1.

The outputting of the training signal from the transmission unit 220 is started earlier by the phase synchronization control time period 2 before the readout operation of the image sensor 111 which is started by the second vertical synchronization signal VD2. Then, the voltage holding state of the loop filter 303 is released, phase synchronization with the reception unit 230 is performed, and the data of the SR readout 2 is received. After the data reception of the SR readout 2 is completed, the voltage of the loop filter 303 is held in accordance with the control signal from the camera control unit 114, and thereafter, the transmission unit 220 is caused to stop, and the reception unit 230 is caused to stand by in the voltage holding state.

After the third vertical synchronization signal VD3, similarly to the case of the vertical synchronization signal VD2, the reception unit 230 is caused to enter the standby state after the data reception is completed, and, before data reception, the phase synchronization control from the standby state is repeated.

By performing such control, power consumption can be reduced even in a moving image having a high frame rate.

Sixth Embodiment

Figure 16:
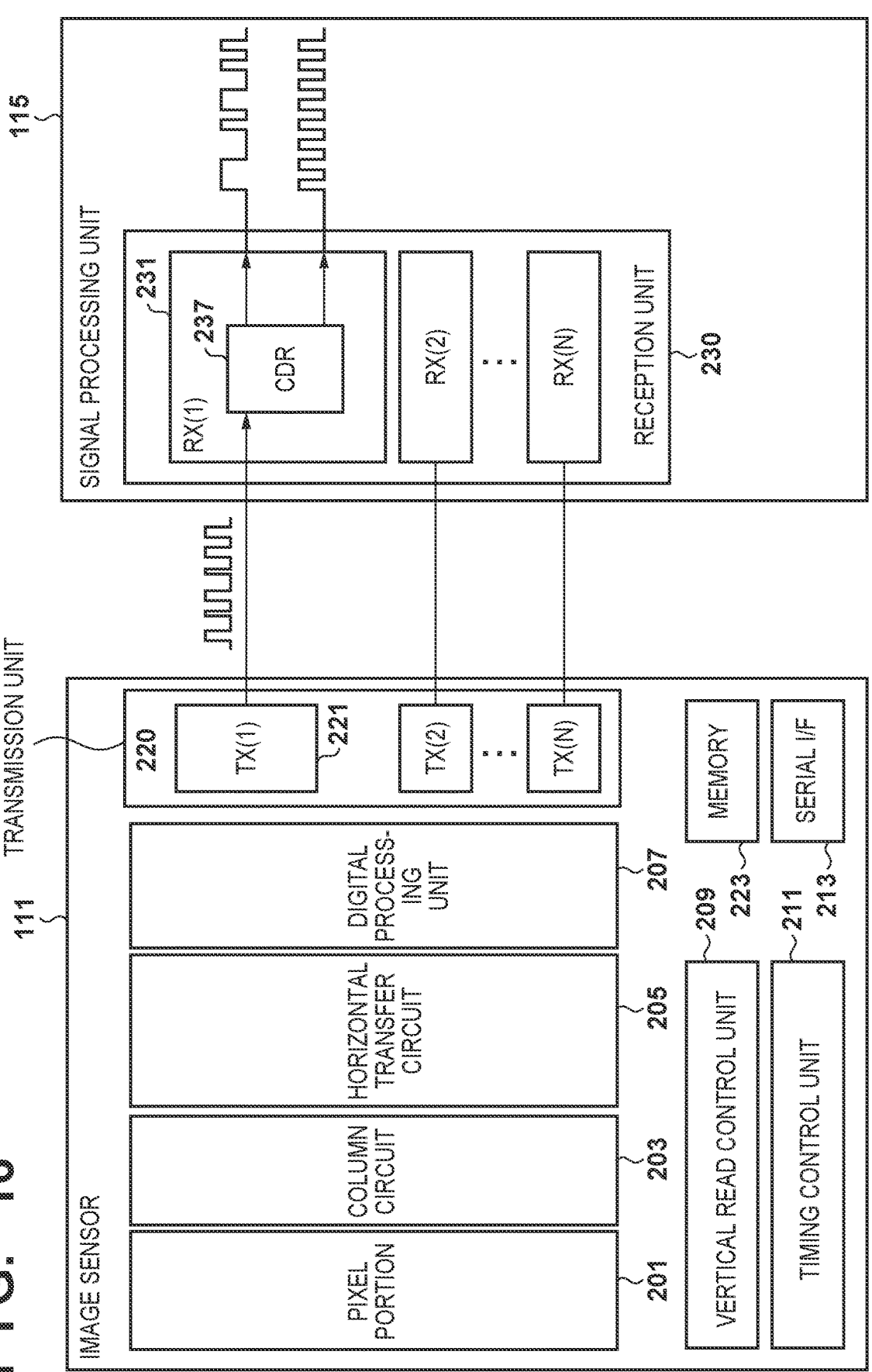
FIG. 16 is a block diagram illustrating a configuration of an image sensor and a signal processing unit in a fifth embodiment.

Hereinafter, the flow of data between the image sensor 111 and the signal processing unit 115 in the sixth embodiment of the present invention will be described with reference to the block diagram of FIG. 16. In the sixth embodiment, by having a memory 223 for temporarily storing image data inside the image sensor 111, it is possible to reduce power consumption in the transmission and reception units even in a driving mode that cannot be achieved with the configuration of the fourth embodiment.

With an increase in the speed of readout of the image sensor 111, it has become possible to perform slow motion moving image shooting in which a pixel signal is read out at a high frame rate of 120 fps, a moving image is recorded, and the moving image is displayed at 60 fps. Also, in the case of shooting a slow motion moving image, since real-time display is required at the time of shooting, only some frames that were read out at a high frame rate are used for display. The display frame rate (display period) depends on the display unit 118 of the image capturing apparatus 100, and approximately 60 fps, which is currently widespread, is used.

Figure 17:
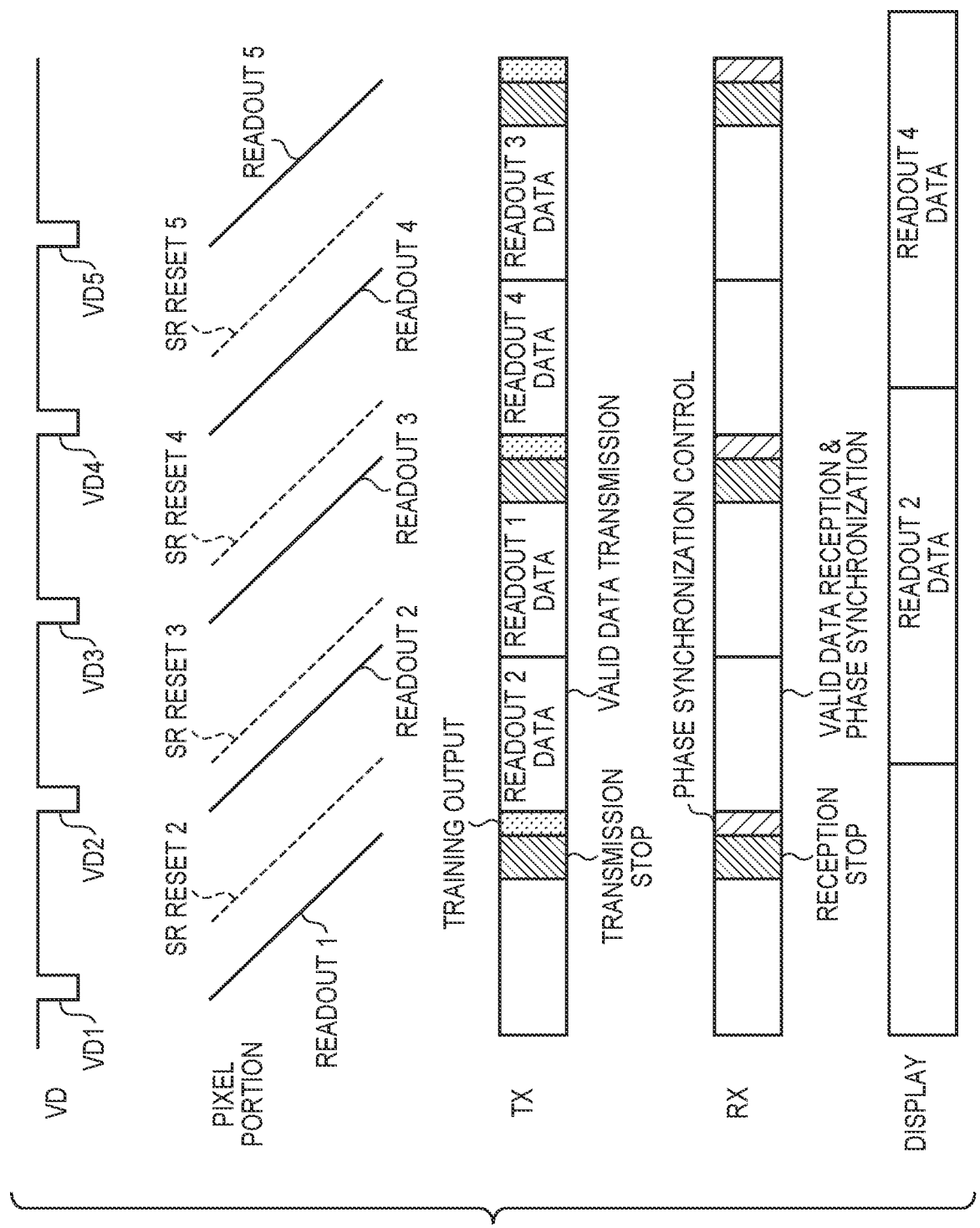
FIG. 17 is a schematic diagram illustrating an operation state of transmission and reception units in a case where shooting of a display frame and a recording frame is periodically repeated.

FIG. 17 is a schematic diagram illustrating an operation state of transmission and reception units in a case where shooting of a display frame and a recording frame is periodically repeated. In the time period between the vertical synchronization signals VD1 and VD2 in FIG. 17, a frame used only in recording is acquired, and in the time period between the vertical synchronization signals VD2 and VD3, a frame used in both displaying and recording is acquired, and thereafter, this is repeated.

The data read out during the time period between the vertical synchronization signals VD1 and VD2 is stored in the memory 223, and the data for this time period is not transmitted (recording frame). The data in the time period between the vertical synchronization signals VD2 and VD3 is transmitted simultaneously with being read out, is subject to image processing so that it can be used for display by the signal processing unit 115, and is displayed on the display unit 118 (display frame).

After the completion of the data transmission of the display frame, the image sensor 111 transmits the data of the recording frame stored in the memory 223, and the reception unit 230 stops after the reception of the display frame and the data of the recording frame is completed.

The signal processing unit 115 acquires a display frame and performs image generation processing for displaying on the display unit 118 of the image capturing apparatus 111. Further, the signal processing unit 115 causes sequentially received recording frames to be stored in a DRAM (not shown), and after the image acquisition of a recording frame between the display frames is completed, the display frame and the recording frame are rearranged in order of exposure time to generate a moving image. The generated moving image is stored in a recording medium.

By performing the control as described above, the number of times of phase synchronization control is reduced, and time for this reduction can be applied to the stop time period to thereby reduce power consumption. Further, since the data once stored in the memory 223 does not have to be subject to a restriction of an amount of time required for AD conversion or the like, in comparison to when it is directly read out from the image sensor 111, data transmission can be performed at a higher frequency.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-184985, filed Sep. 28, 2018, which is hereby incorporated by reference herein in its entirety.

What is claimed is:

1. An image capturing apparatus, comprising:
an image sensor having a pixel portion in which a plurality of pixels are arranged, and a transmission circuit configured to transmit an overlap signal in which image data obtained from the pixel portion and a clock are overlapped; and
at least one processor or circuit configured to function as the following units:
an image processing unit that has a reception circuit configured to receive the overlap signal from the transmission circuit of the image sensor, and is configured to reproduce the image data and the clock; and
a control unit configured to control the image sensor and the image processing unit,
wherein, before the transmission circuit starts transmission of the image data, the control unit performs control so as to cause a training signal, for synchronizing the transmission circuit and the reception circuit in frequency, to be transmitted from the transmission circuit,
wherein the reception circuit is capable of switching a frequency synchronization control for synchronizing with the transmission circuit between a first frequency synchronization control and a second frequency synchronization control,
wherein in the first frequency synchronization control and the second frequency synchronization control, the transmission circuit and the reception circuit are synchronized with each other in frequency by feeding back a result of comparing the clock which the reception circuit uses for reproducing the image and the training signal, and
wherein a gain of the feeding back in the first frequency synchronization control is larger than that in the second frequency synchronization control.

2. The image capturing apparatus according to claim 1, wherein
the reception circuit comprises a register for storing a setting value of a frequency-synchronized state, and
the control unit performs the second frequency synchronization control based on the setting value stored in the register in a case of performing the frequency synchronization control after performing the first frequency synchronization control or the second frequency synchronization control.

3. The image capturing apparatus according to claim 2, wherein the control unit performs the first frequency synchronization control in a case of performing the frequency synchronization control for the first time after the image capturing apparatus is activated.

4. The image capturing apparatus according to claim 1, wherein the reception circuit stops an operation when not in a time period for communicating the image data.

5. The image capturing apparatus according to claim 4, wherein an operation of the transmission circuit is stopped while the operation of the reception circuit is stopped.

6. The image capturing apparatus according to claim 1, wherein the control unit is capable of switching between a plurality of shooting modes, each having a different number of pixels read out from the image sensor or a different frame rate, and, for each shooting mode of the plurality of shooting modes, and the control unit determines whether or not to stop an operation of the reception circuit between a transmission operation of image data from the image sensor and a subsequent transmission operation of image data.

7. The image capturing apparatus according to claim 6, further comprising a plurality of transmission lanes for transmitting the image data from the transmission circuit to the reception circuit,
wherein, for each shooting mode of the plurality of shooting modes, the control unit trains a transmission lane used for transmission of image data and does not train a transmission lane not used for transmission of image data.

8. The image capturing apparatus according to claim 5, wherein the control unit, in a case of restarting communication of image data from a state of having caused the transmission circuit and the reception circuit to stop, outputs an instruction to start frequency synchronization control to the reception circuit a predetermined amount of time before the transmission circuit restarts transmission of the image data.

9. The image capturing apparatus according to claim 1, wherein the image sensor and the control unit have a synchronization signal for synchronizing timings with each other, and, in a case where a count value of the synchronization signal has reached a first count value, the control unit causes the transmission circuit to start output of the training signal, and, in a case where the count value of the synchronization signal has reached a second count value greater than the first count value, causes the reception circuit to start the first frequency synchronization control or the second frequency synchronization control.

10. The image capturing apparatus according to claim 9, wherein the control unit, in the first frequency synchronization control and the second frequency synchronization control, changes a timing for causing the transmission circuit to start outputting the training signal.

11. The image capturing apparatus according to claim 2, wherein the control unit calculates a value to be set in a register of another lane based on a value acquired from the register of the reception circuit in the frequency synchronization control and a value acquired from the register of the reception circuit when the reception circuit was in a frequency synchronization state at another time.

12. The image capturing apparatus according to claim 2, wherein the control unit performs the first frequency synchronization control or the second frequency synchronization control at a time of manufacturing the image capturing apparatus, and causes the register to store a setting value.

13. The image capturing apparatus according to claim 1, wherein the transmission circuit and the reception circuit are caused to be stopped in a state in which the image sensor is being caused to accumulate charge in the pixel portion.

14. The image capturing apparatus according to claim 1, wherein the control unit causes the transmission circuit to output the training signal so that a time period for the frequency synchronization control can be secured before the transmission circuit transmits the image data.

15. The image capturing apparatus according to claim 1, wherein the image sensor sequentially reads out a pixel signal for each row at a predetermined frame rate, and the control unit determines whether or not to cause the transmission circuit and the reception circuit to stop based on a readout time of the pixel signal and a length of a non-readout period decided by the predetermined frame rate.

16. The image capturing apparatus according to claim 1, wherein the reception circuit comprises a voltage controlled oscillator, a loop filter configured to input a voltage to the voltage controlled oscillator, and a voltage holding circuit configured to hold a voltage of the loop filter, and
wherein the control unit causes a voltage value of the loop filter to be held before the transmission circuit stops, causes the reception circuit to enter a standby state, and when causing the reception circuit to return from a stopped state, causes the reception circuit to return from the standby state to a synchronization state.

17. The image capturing apparatus according to claim 1, wherein
the image sensor further includes a storage circuit configured to temporarily store the image data,
the image capturing apparatus further includes:
a display apparatus configured to display some frames of the image data as display frames at a predetermined display period; and
an image processing unit configured to generate a moving image in which remaining frames of the image data are recording frames and the display frames and the recording frames are temporally arranged, and
the control unit causes the storage circuit to store image data of one of the recording frames, causes transmission of image data of one of the display frames at a timing synchronized with readout of the image data of the one of the display frames, and transmits the one of the recording frames stored in the storage circuit after the data transmission of the one of the display frames completes.

18. A method of controlling an image capturing apparatus provided with an image sensor having a pixel portion in which a plurality of pixels are arranged and a transmission circuit operable to transmit an overlap signal in which image data obtained from the pixel portion and a clock are overlapped, and an image processing unit that has a reception circuit operable to receive the overlap signal from the transmission circuit of the image sensor, and is operable to reproduce the image data and the clock, the method comprising:
controlling the image sensor and the image processing unit,
wherein, in the controlling, before the transmission circuit starts transmission of the image data, control is performed so as to cause a training signal for synchronizing the transmission circuit and the reception circuit in frequency to be transmitted from the transmission circuit,
wherein, in the controlling, a frequency synchronization control for synchronizing with the transmission circuit is able to be switched between a first frequency synchronization control and a second frequency synchronization control,
wherein in the first frequency synchronization control and the second frequency synchronization control, the transmission circuit and the reception circuit are synchronized with each other in frequency by feeding back a result of comparing the clock which the reception circuit uses for reproducing the image and the training signal, and
wherein, in the controlling, a gain of the feeding back in the first frequency synchronization control is set to be larger than that in the second frequency synchronization control.

19. A non-transitory computer-readable storage medium storing a program for causing a computer to execute a method of controlling an image capturing apparatus provided with an image sensor having a pixel portion in which a plurality of pixels are arranged and a transmission circuit operable to transmit an overlap signal in which image data obtained from the pixel portion and a clock are overlapped, and an image processing unit that has a reception circuit operable to receive the overlap signal from the transmission circuit of the image sensor, and is operable to reproduce the image data and the clock, the method comprising:
controlling the image sensor and the image processing unit,
wherein, in the controlling, before the transmission circuit starts transmission of the image data, control is performed so as to cause a training signal, for synchronizing the transmission circuit and the reception circuit in frequency, to be transmitted from the transmission circuit,
wherein, in the controlling, a frequency synchronization control for synchronizing with the transmission circuit is able to be switched between a first frequency synchronization control and a second frequency synchronization control,
wherein in the first frequency synchronization control and the second frequency synchronization control, the transmission circuit and the reception circuit are synchronized with each other in frequency by feeding back a result of comparing the clock which the reception circuit uses for reproducing the image and the training signal, and
wherein, in the controlling, a gain of the feeding back in the first frequency synchronization control is set to be larger than that in the second frequency synchronization control.

* * * * *